US012135382B2

(12) United States Patent
Meyer et al.

(10) Patent No.: US 12,135,382 B2
(45) Date of Patent: Nov. 5, 2024

(54) SYSTEMS AND METHODS FOR DETECTING UNMANNED AERIAL VEHICLES VIA RADIO FREQUENCY ANALYSIS

(71) Applicant: Dedrone Holdings, Inc., San Francisco, CA (US)

(72) Inventors: Henning Meyer, Kassel (DE); Nico Otterbach, Fuldatal (DE); Kai Baumgart, Kassel (DE)

(73) Assignee: Dedrone Holdings, Inc., San Francisco, CA (US)

( * ) Notice: Subject to any disclaimer, the term of this patent is extended or adjusted under 35 U.S.C. 154(b) by 0 days.

(21) Appl. No.: 18/164,121

(22) Filed: Feb. 3, 2023

(65) Prior Publication Data

US 2023/0236279 A1    Jul. 27, 2023

Related U.S. Application Data

(63) Continuation of application No. 16/261,226, filed on Jan. 29, 2019, now Pat. No. 11,585,886.
(Continued)

(51) Int. Cl.
*G01S 3/48* (2006.01)
*G01S 3/04* (2006.01)
(Continued)

(52) U.S. Cl.
CPC ............... *G01S 3/48* (2013.01); *G01S 3/043* (2013.01); *G08G 5/0082* (2013.01); *H04B 1/0003* (2013.01); *H04B 1/0057* (2013.01)

(58) Field of Classification Search
CPC ......... G01S 3/48; G01S 3/043; G08G 5/0082; H04B 1/0003; H04B 1/0057
(Continued)

(56) References Cited

U.S. PATENT DOCUMENTS 9,689,976 B2 * 6/2017 Parker ...................... G01S 7/38
9,715,009 B1    7/2017 Parker et al.
(Continued)

FOREIGN PATENT DOCUMENTS

WO    20160122739 A2    8/2016

*Primary Examiner* — Bo Fan
(74) *Attorney, Agent, or Firm* — Morris, Manning & Martin, LLP; Daniel E. Sineway, Esq.; Adam J. Thompson, Esq.

(57) ABSTRACT

Systems and methods for detecting radio frequency ("RF") signals and corresponding origination locations are disclosed. An RF sensor device includes a software-defined radio and an antenna pair for receiving RF signals. Furthermore the RF sensor device may include a processing unit for processing/analyzing the RF signals, or the processing unit may be remote. The system calculates a phase difference between an RF signal received at two separate antennas of an antenna pair. The phase difference, the distance between the antennas, and the frequency of the RF signal are used for determining the origination direction of the RF signal. In various embodiments, the origination direction may indicate the location of a UAV controller or base station. The software-defined radio may include more than one antenna pair, connected to multiplexers, for efficiently scanning different frequencies by alternating active antenna pairs. Moreover, the system may execute packet-based processing on the RF signal data.

16 Claims, 13 Drawing Sheets

OVERVIEW OF UNMANNED AERIAL VEHICLE TRACKING AND MONITORING SYSTEM

Related U.S. Application Data

(60) Provisional application No. 62/623,193, filed on Jan. 29, 2018.

(51) Int. Cl.
*G08G 5/00* (2006.01)
*H04B 1/00* (2006.01)

(58) Field of Classification Search
USPC .......................... 342/367, 445, 417, 464, 377
See application file for complete search history.

(56) References Cited

U.S. PATENT DOCUMENTS

| | | |
|---|---|---|
| 9,977,117 B2 * | 5/2018 | Parker ..................... G01S 13/88 |
| 10,156,631 B2 | 12/2018 | Parker et al. |
| 10,281,570 B2 * | 5/2019 | Parker ..................... G01S 3/782 |
| 10,670,696 B2 | 6/2020 | Parker et al. |
| 10,739,451 B1 | 8/2020 | Parker et al. |
| 10,795,010 B2 | 10/2020 | Parker et al. |
| 10,907,940 B1 | 2/2021 | Parker et al. |
| 2016/0245907 A1 * | 8/2016 | Parker ................... B64C 39/024 |

* cited by examiner

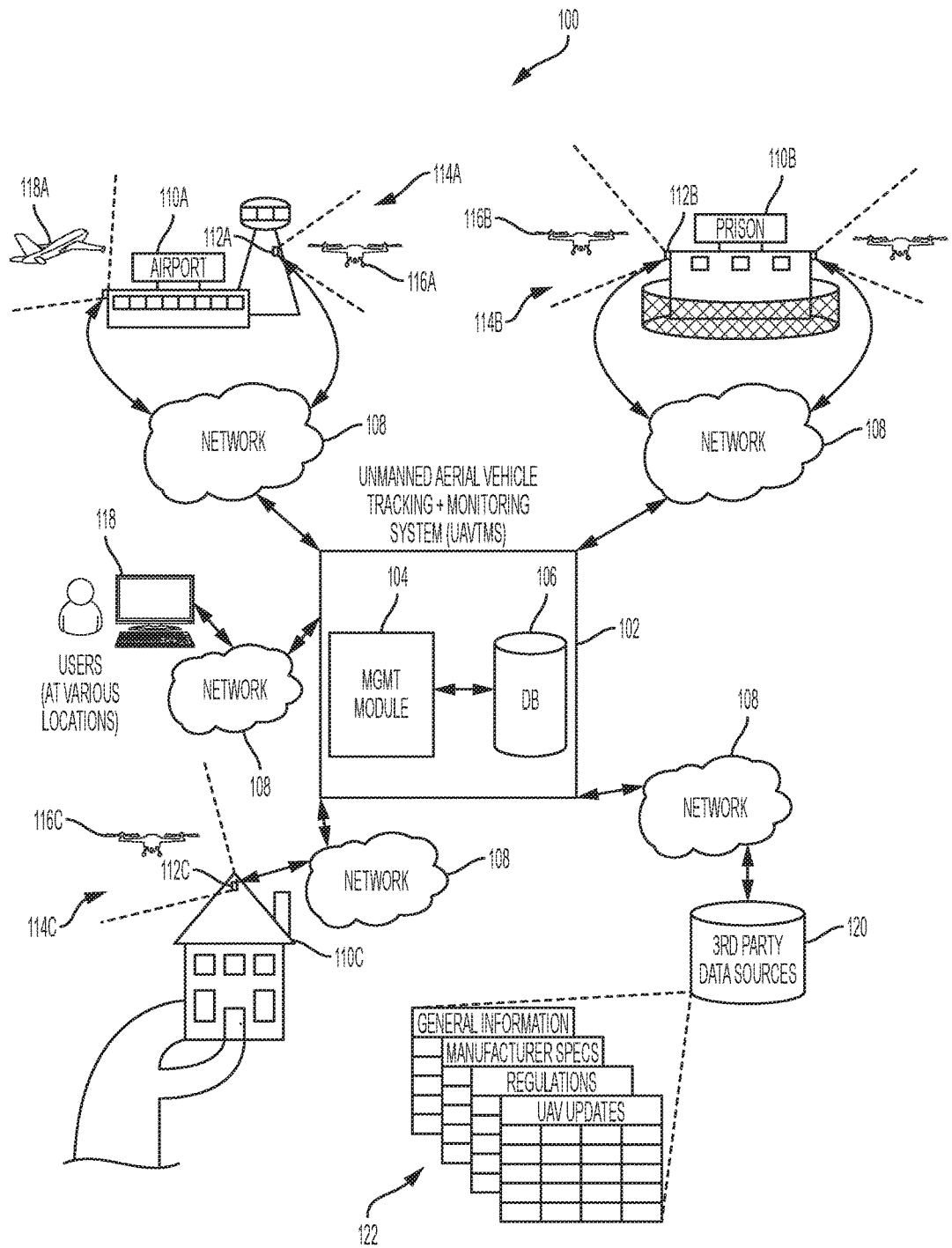
FIG. 1: OVERVIEW OF UNMANNED AERIAL VEHICLE TRACKING AND MONITORING SYSTEM

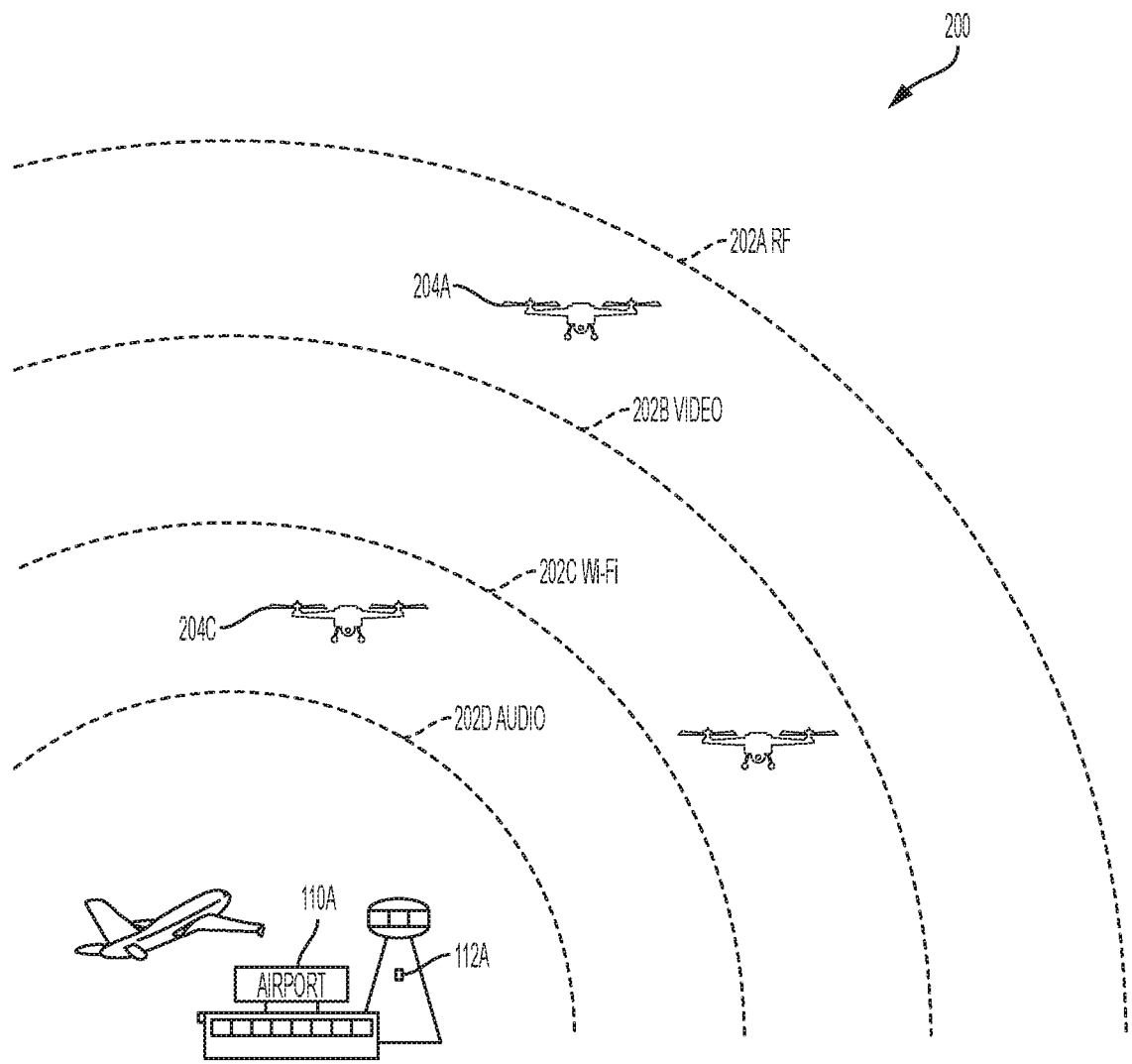
FIG. 2: EXEMPLARY SENSOR RANGES

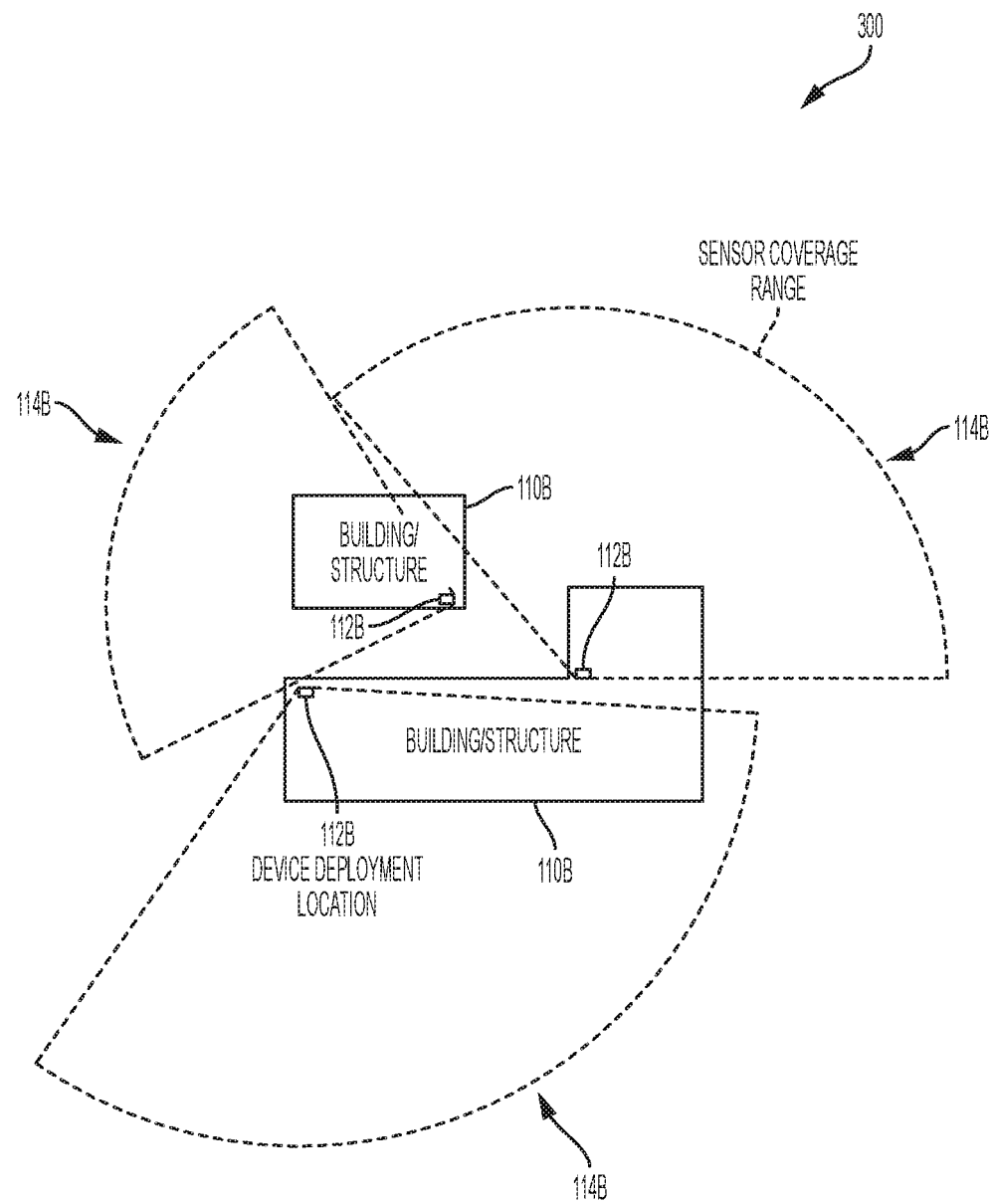
FIG. 3: EXEMPLARY SENSOR RANGES AND DIRECTED COVERAGE

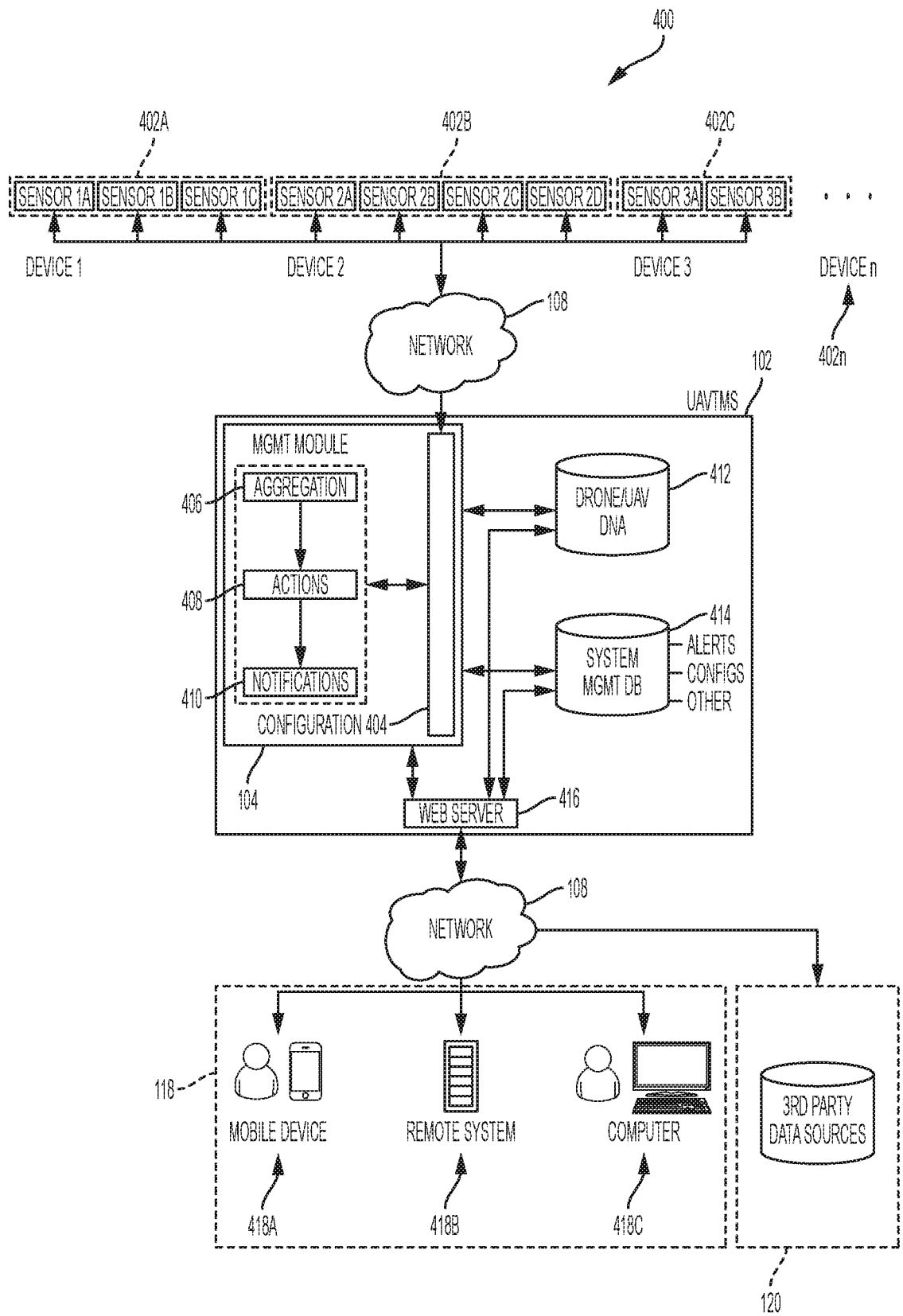
FIG. 4: EXEMPLARY SYSTEM ARCHITECTURE

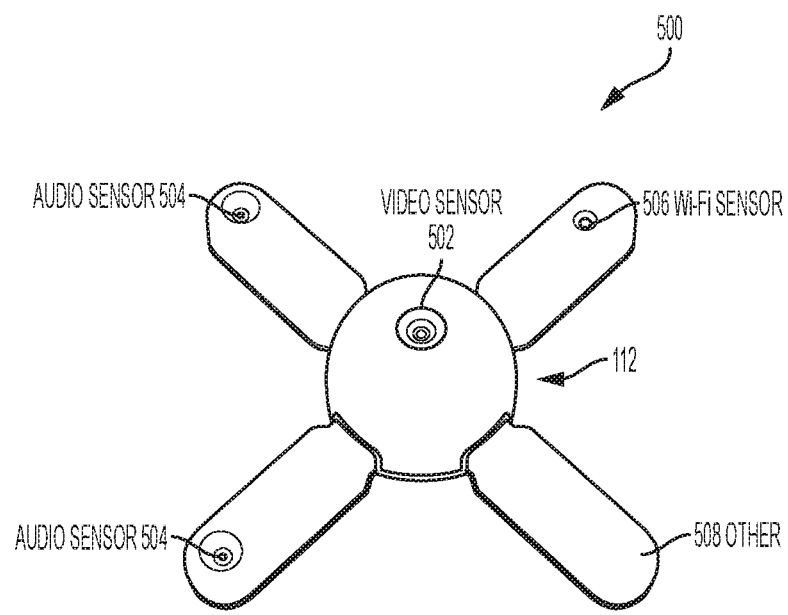
FIG. 5A: EXEMPLARY SENSOR DEVICE
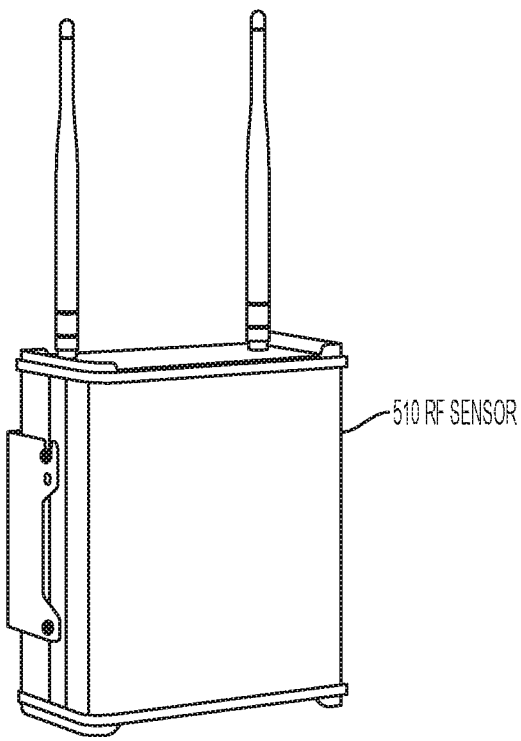
FIG. 5B: EXEMPLARY RF SENSOR DEVICE

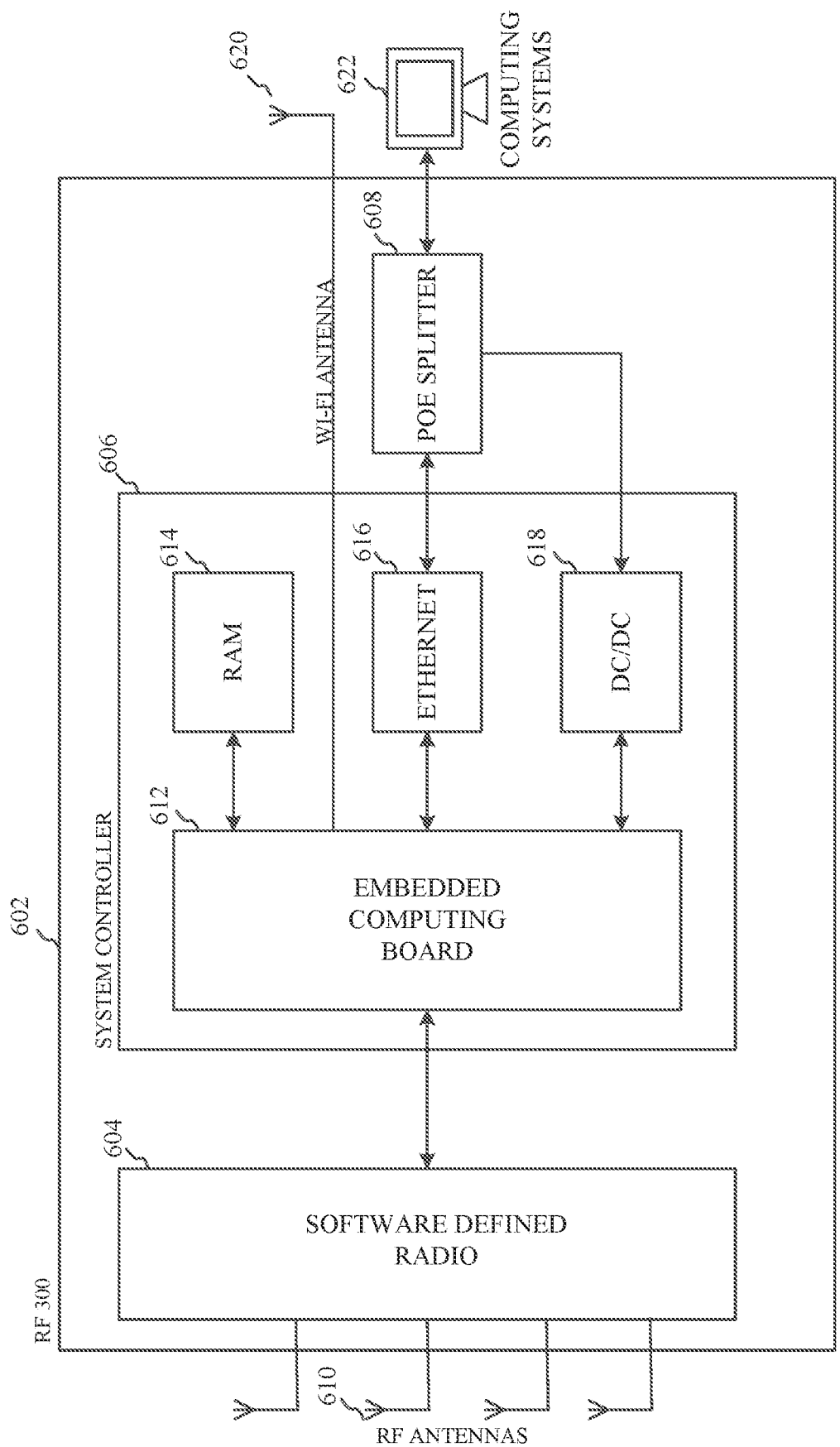
FIG. 6: SYSTEM DIAGRAM

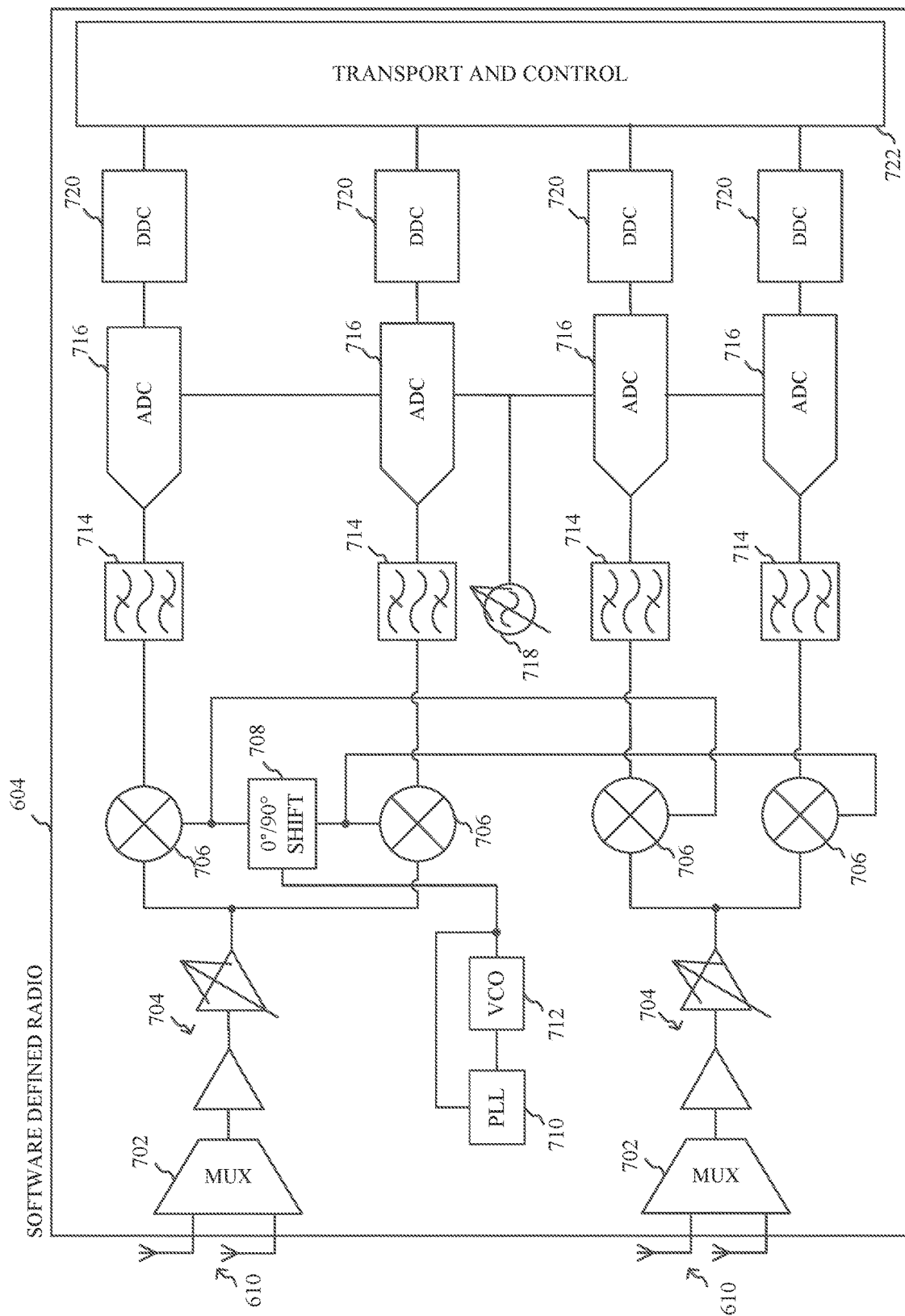
FIG. 7: GENERAL RECEIVER CHAIN

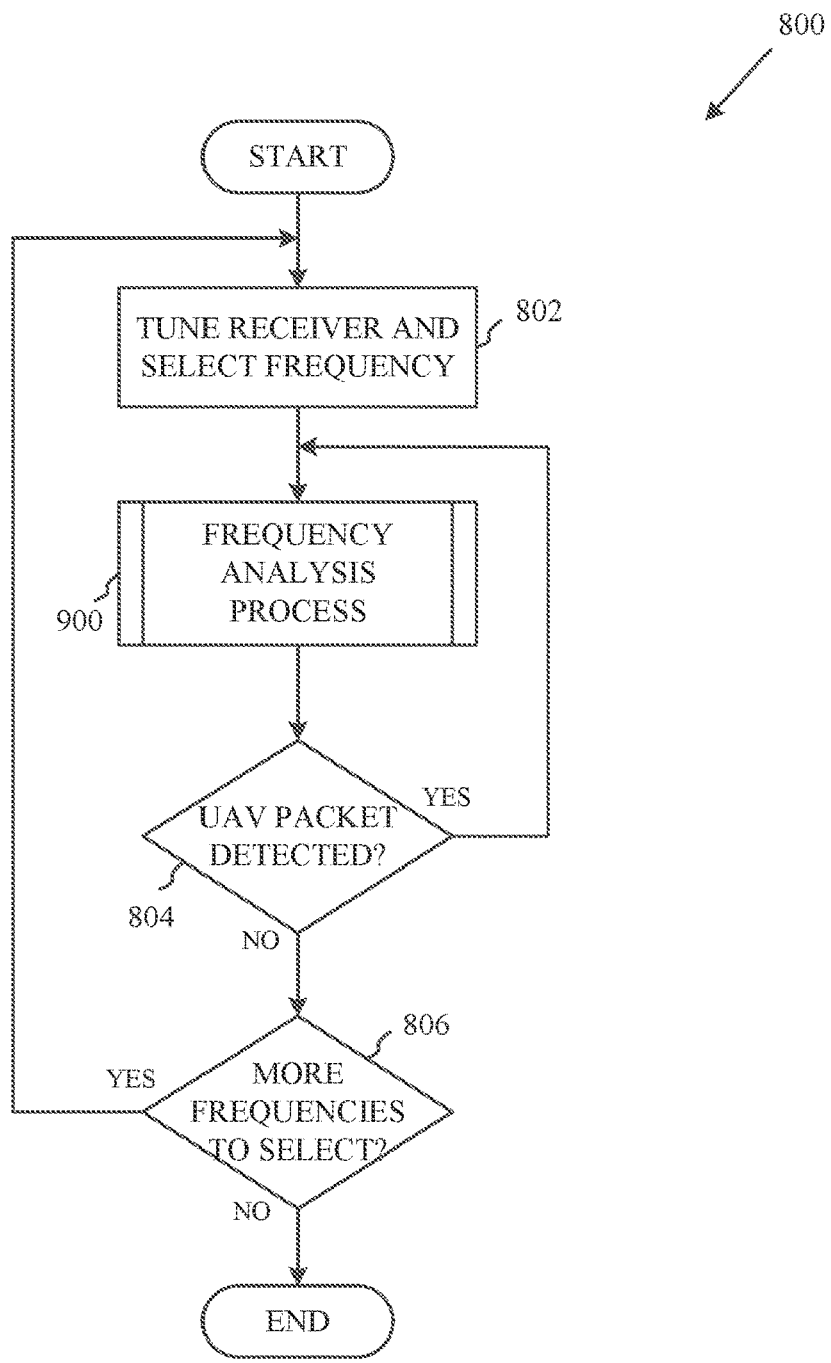
FIG. 8: FREQUENCY TUNING PROCESS

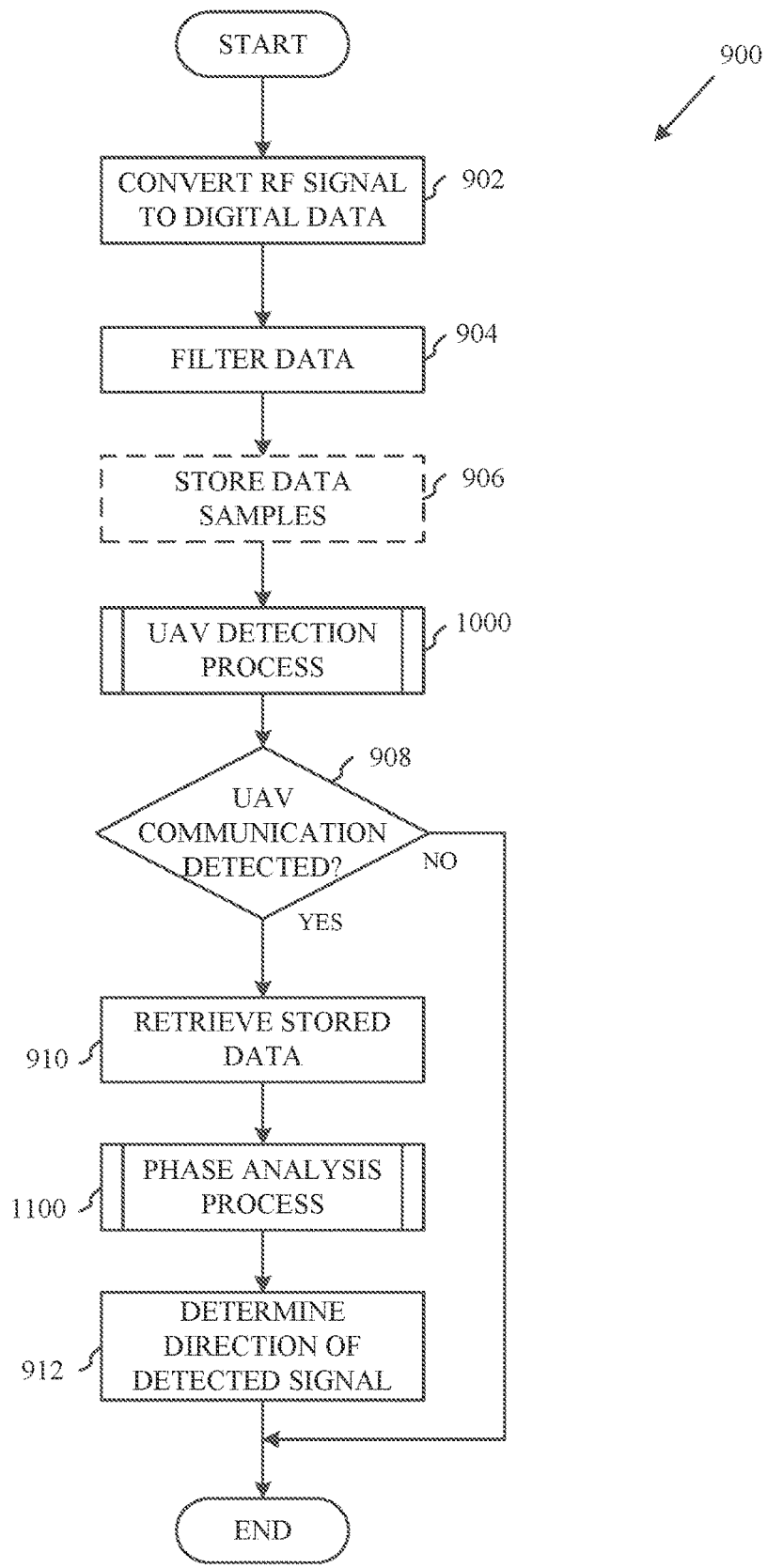
FIG. 9: FREQUENCY ANALYSIS PROCESS

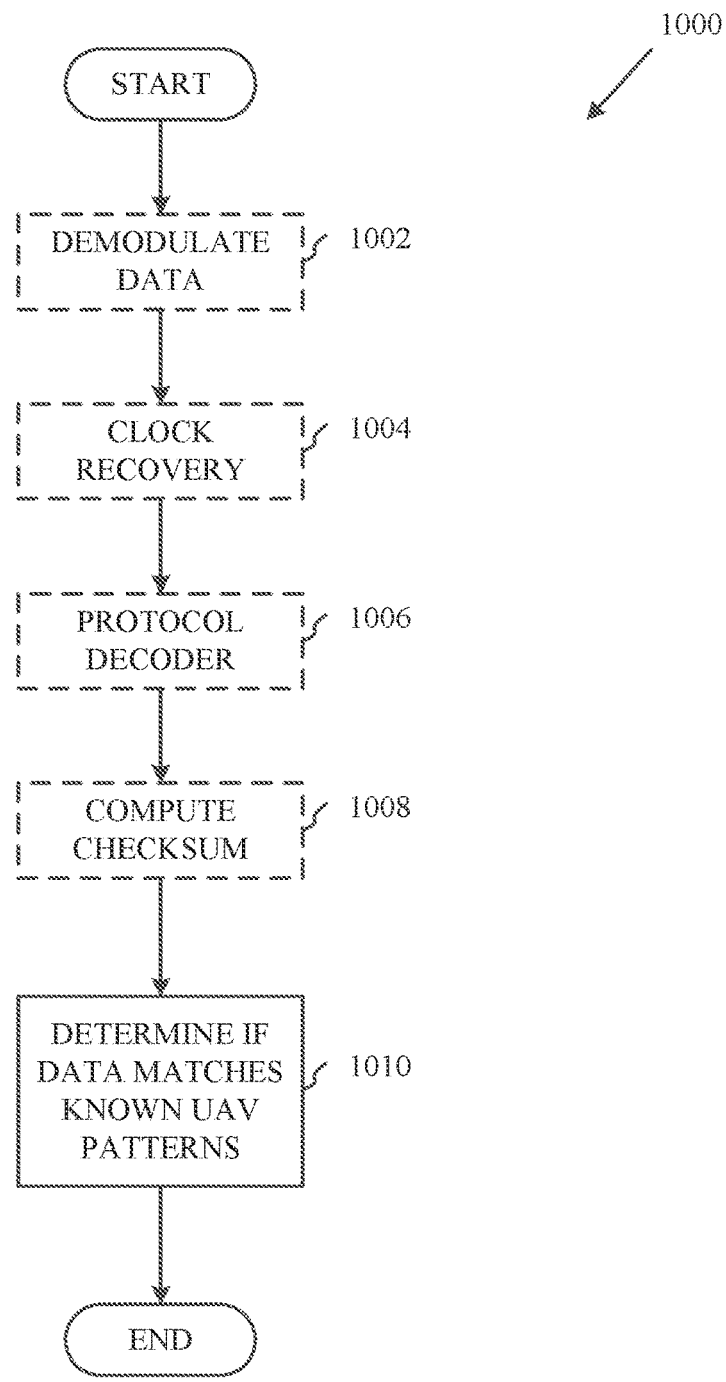
FIG. 10: UAV DETECTION PROCESS

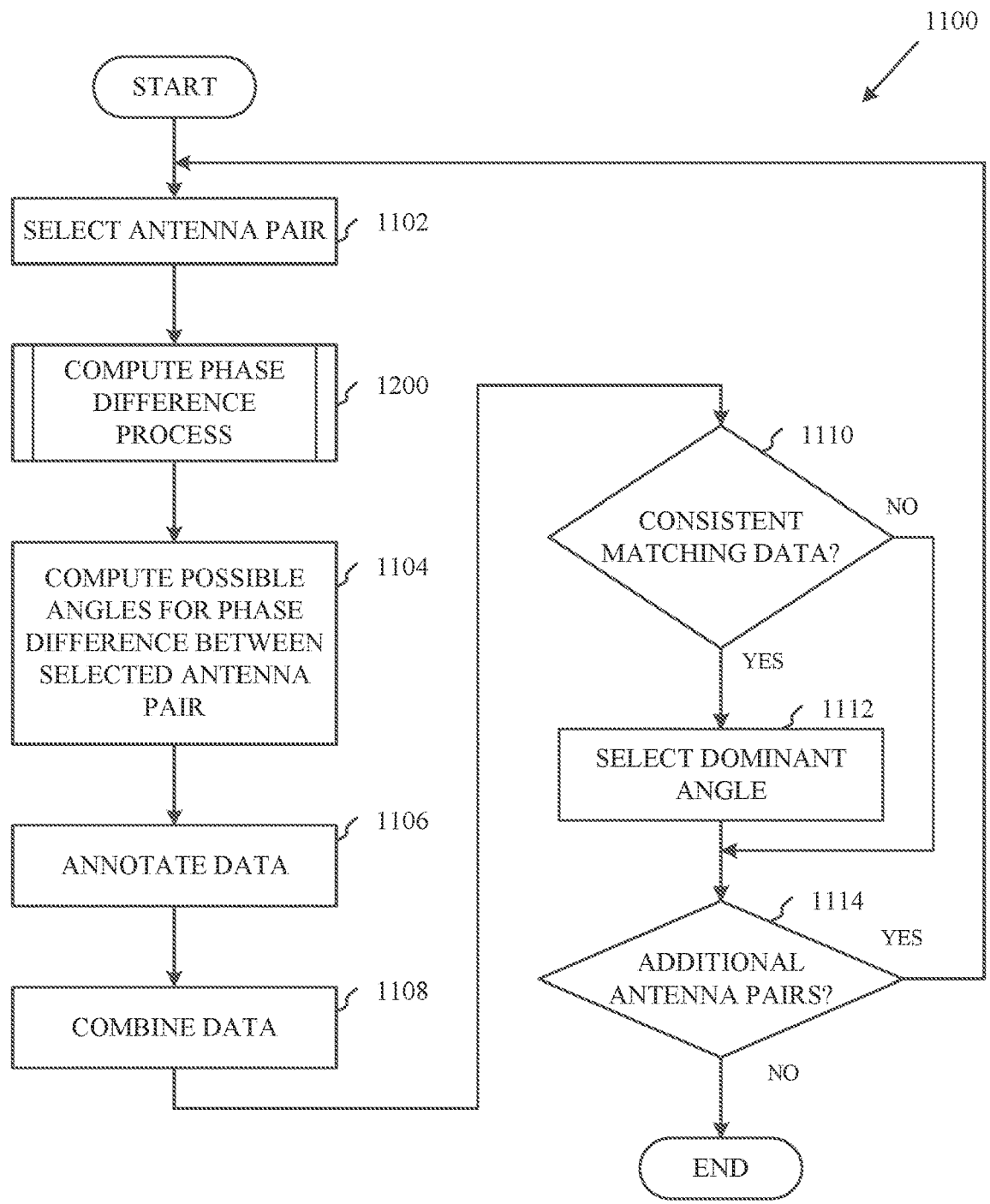
FIG. 11: PHASE ANALYSIS PROCESS

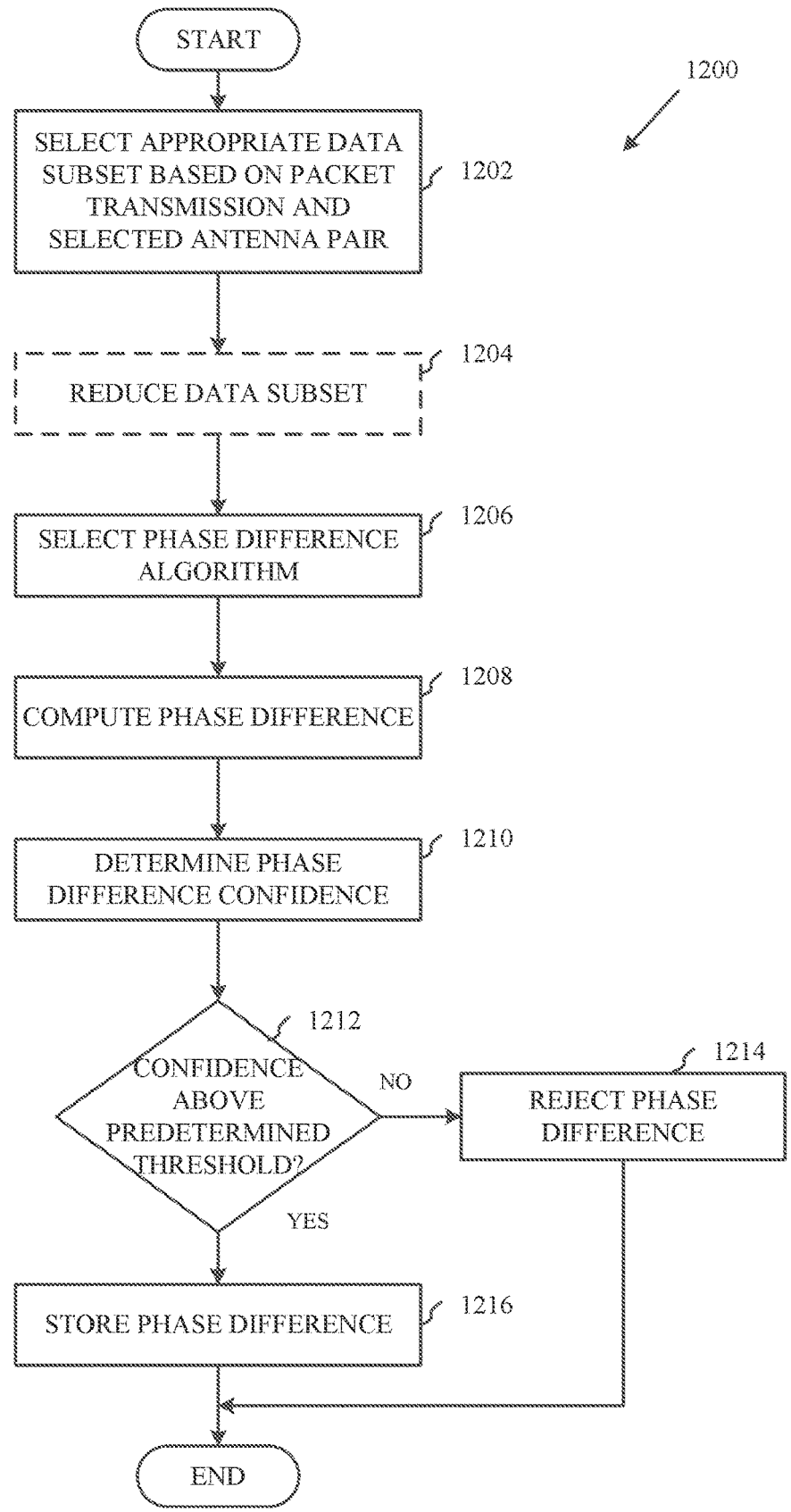
FIG. 12: COMPUTE PHASE DIFFERENCE PROCESS

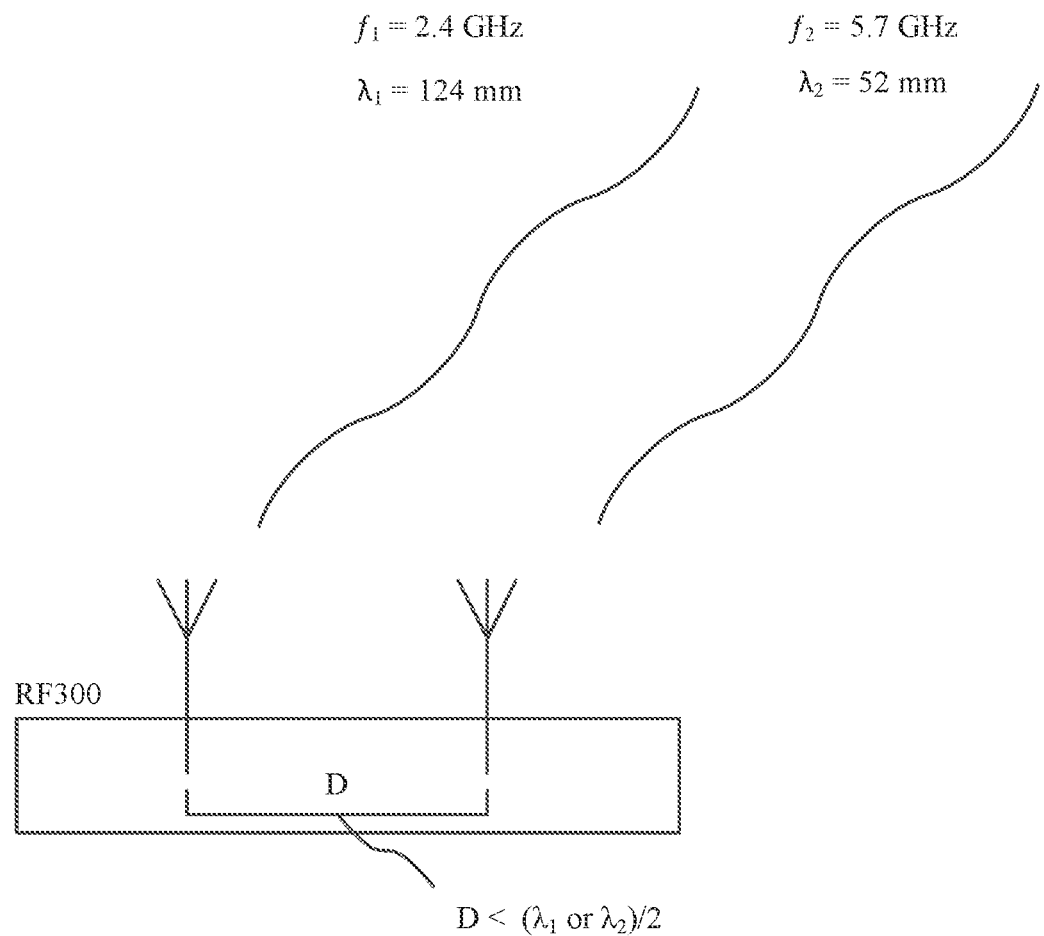
FIG. 13: EXEMPLARY ANTENNA CONFIGURATION

SYSTEMS AND METHODS FOR DETECTING UNMANNED AERIAL VEHICLES VIA RADIO FREQUENCY ANALYSIS

CROSS REFERENCE TO RELATED APPLICATIONS

This application is a continuation of U.S. patent application Ser. No. 16/261,226, filed on Jan. 29, 2019 and entitled "SYSTEMS AND METHODS FOR DETECTING UNMANNED AERIAL VEHICLES VIA RADIO FREQUENCY ANALYSIS," which claims the benefit of, and priority to, U.S. Provisional Patent App. No. 62/623,193, filed on Jan. 29, 2018 and entitled "SYSTEMS AND METHODS FOR DETECTING UNMANNED AERIAL VEHICLES VIA RADIO FREQUENCY ANALYSIS," the disclosures of which are incorporated by reference in their entireties as if the same were fully set forth herein.

TECHNICAL FIELD

The present disclosure relates generally to detecting unmanned aerial vehicles and related communications/signals via radio frequency analysis.

BACKGROUND

Unmanned Aerial Vehicles (UAVs), often referred to as "drones", are generally aircrafts operated without the presence of a pilot on board. UAVs vary in size and may be controlled in real time from a remote location, or configured to operate autonomously. The introduction and growing popularity of UAVs in the airspace has raised issues regarding government regulations and the allowable usage of UAVs.

The anonymous nature of UAVs has introduced problems in areas where accountability and identity are of the utmost importance. Locations such as airports, prisons, sporting venues, residential homes, etc., are among these areas that require a safe and regulated airspace around their perimeters, and UAVs compromise the ability to ensure the safety of such airspaces. Therefore, there is a long-felt but unresolved need for a system, method, and/or apparatus that is designed to detect, identify, and track UAVs in order to better protect airspaces and the areas they surround.

BRIEF SUMMARY OF DISCLOSURE

Briefly described, and according to one embodiment, aspects of the present disclosure relate generally to systems and methods for detecting unmanned aerial vehicles (UAVs), and/or the controllers of UAVs, via radio frequency ("RF") analysis. In one embodiment, and in accordance with aspects of the present disclosure, UAVs may be controlled by radio frequency signals emitted from base stations (e.g., handheld remote controllers or stationary devices). These base stations may be located hundreds of meters away from the current location of the UAV, thereby making it difficult to determine the direction and origin of the RF signal, and thus the location of the base station. Furthermore, buildings, landscapes, and other obstructions may shadow or reflect RF signals from their original trajectory. Accordingly, an interceptor of a reflected RF signal may falsely determine that the signal originated from one direction, when it actually originated from a completely different direction, thereby making the origin of the signal difficult to locate. Furthermore, UAVs typically transmit data back to their corresponding base stations, thereby creating another opportunity for RF signals to be intercepted. According to particular embodiments, applying various methods of RF phase analysis and antenna pair switching as described herein allows for greater confidence when determining the direction of origin of intercepted RF signals.

In some embodiments, the RF functionality of the system described herein may be a particular portion of a larger system which may include a plurality of sensors for detecting, locating, and managing UAVs. In one embodiment, in addition to RF sensors, the system may include video sensors, audio sensors, Wi-Fi sensors, etc. In one embodiment, video sensors may be configured to "see" any approaching objects, and the sensors may record high definition video and detect objects approaching from 100 meters (or more) away (or other predetermined distances based on technical specifications of the video sensor). According to various aspects of the present disclosure, audio sensors may be configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information.

According to various aspects of the present disclosure, the RF sensor and receiver configuration discussed herein includes at least one software defined radio (SDR) which allows the RF sensor to be dynamically configurable to monitor various RF frequency ranges within the radio frequency spectrum, such as the RF frequencies commonly used to control UAVs. As will be understood to one of ordinary skill in the art, SDRs include a collection of hardware that, in an initial state, is generally inoperable until a user configures the hardware in a particular way, which is often a custom configuration. In various embodiments, a plurality of antennas may be either internally configured within the SDR or may be externally coupled to the SDR. In certain embodiments, particular antenna pairs and the RF signals they receive may be analyzed for phase differences, which in result may allow a user to determine the direction of origin of the RF signal. In one embodiment, the SDR included in the RF sensor may be configured to monitor subsets of frequencies across the entire radio frequency spectrum (3 kHz-300 GHz). In certain embodiments, the RF sensor (and other sensors) may collect it's respective data and process the data locally within the circuitry of the sensor. In other embodiments, the RF sensor collects the data and forwards the data to a central server which then processes the data.

In one embodiment, the present disclosure discusses a system for radio frequency ("RF") signal detection, the system including: a software-defined radio including a first antenna pair having a first distance and positioned at a first orientation, wherein the first distance is a physical distance between a first antenna and a second antenna of the first antenna pair, and wherein the first distance and the first orientation are for determining an origination direction of a RF signal; and a processing unit operatively connected to the software defined radio, wherein the processing unit includes at least one processor configured to: tune the software defined radio, wherein tuning the software defined radio includes configuring the first antenna pair to receive the RF signal at a particular frequency; receive the RF signal via the first antenna and the second antenna of the first antenna pair; determine a first phase difference between the RF signal received via the first antenna and the RF signal received via the second antenna; and in response to determining the first phase difference, calculate a first set of one or more origination directions of the RF signal based on the first phase difference, the first distance, and the particular frequency.

In various embodiments, the software-defined radio further includes a second antenna pair having a second distance and positioned at a second orientation, and wherein the second distance is a physical distance between a third antenna and a fourth antenna of the second antenna pair.

In one embodiment, the first antenna pair and the second antenna pair are operatively connected to two or more multiplexers for selecting between RF signals received via the first antenna pair and the second antenna pair.

In certain embodiments, the at least one processor is further configured to: receive, via switching the two or more multiplexers to the second antenna pair, the RF signal via the third antenna and the fourth antenna of the second antenna pair; determine a second phase difference between the RF signal received via the third antenna and the RF signal received via the fourth antenna; in response to determining the second phase difference, calculate a second set of one or more origination directions of the RF signal based on the second phase difference, the second distance, and the particular frequency; and compare the first set of one or more origination directions to the second set of one or more origination directions to determine a common origination direction, wherein the common origination direction corresponds to the actual origination direction of the RF signal.

In one embodiment, the first distance is substantially equidistant to the second distance. In various embodiments, the first distance is different from the second distance. In certain embodiments, the first orientation is different from the second orientation.

In a particular embodiment, the at least one processor is further configured to switch between the first antenna pair and the second antenna pair via the two or more multiplexers for receiving RF signals at different frequencies. In various aspects, the software defined radio further includes a third antenna pair having a third distance and positioned at a third orientation, wherein the third distance is a physical distance between a fifth antenna and a sixth antenna of the third antenna pair, and the third distance is different from the first distance and the second distance. In a particular aspect, the first antenna pair, the second antenna pair, and the third antenna pair are each operatively connected to the two or more multiplexers for selecting between RF signals received via the first antenna pair, the second antenna pair, and the third antenna pair. In one embodiment, the third orientation is different from the first orientation and the second orientation. In certain embodiments, the at least one processor is further configured to switch between the first antenna pair, the second antenna pair, and the third antenna pair via the two or more multiplexers for receiving RF signals at different frequencies.

In a particular embodiment, the first distance is less than half of a wavelength corresponding to the particular frequency.

In some embodiments, prior to determining the first phase difference, the at least one processor is configured to: extract one or more data packets from the received RF signal; and analyze the one or more data packets to determine if the received RF signal includes an RF communication emanated from a UAV source. In certain embodiments, extracting one or more data packets from the received RF signal includes demodulating the RF signal. In various embodiments, analyzing the one or more data packets from the received RF signal includes: performing a clock recovery process on the one or more data packets; performing a protocol decoder process on the one or more data packets; and validating a checksum included in the one or more data packets.

In one embodiment, analyzing the one or more data packets includes determining if the one or more data packets corresponds to known UAV signal patterns, and wherein the UAV source includes a UAV, UAV base station, or UAV controller. In a particular embodiment, the processing unit includes at least one central processing unit ("CPU") and at least one graphics processing unit ("GPU") for processing the RF signal.

In further embodiments, the present disclosure discusses a method for radio frequency ("RF") signal detection, including the steps of: tuning a software-defined radio, via a processing unit operatively connected to the software-defined radio, to configure a first antenna pair to receive an RF signal at a particular frequency, wherein the first antenna pair includes a first distance and is positioned at a first orientation, the first distance being a physical distance between a first antenna and a second antenna of the first antenna pair, and wherein the first distance and the first orientation are for determining an origination direction of the RF signal; receiving the RF signal via the first antenna and the second antenna of the first antenna pair; determining a first phase difference between the RF signal received via the first antenna and the RF signal received via the second antenna; and in response to determining the first phase difference, calculating a first set of one or more origination directions of the RF signal based on the first phase difference, the first distance, and the particular frequency.

According to various aspects of the present disclosure, the software-defined radio further includes a second antenna pair having a second distance and positioned at a second orientation, and wherein the second distance is a physical distance between a third antenna and a fourth antenna of the second antenna pair.

In a particular embodiment, the first antenna pair and the second antenna pair are operatively connected to two or more multiplexers for selecting between RF signals received via the first antenna pair and the second antenna pair.

In various embodiments, the method further includes the steps of: receiving, via switching the two or more multiplexers to the second antenna pair, the RF signal via the third antenna and the fourth antenna of the second antenna pair; determining a second phase difference between the RF signal received via the third antenna and the RF signal received via the fourth antenna; in response to determining the second phase difference, calculating a second set of one or more origination directions of the RF signal based on the second phase difference, the second distance, and the particular frequency; and comparing the first set of one or more origination directions to the second set of one or more origination directions to determine a common origination direction, wherein the common origination direction corresponds to the actual origination direction of the RF signal.

In one embodiment, the first distance is substantially equidistant to the second distance. In some embodiments, the first distance is different from the second distance. In a particular embodiment, the first orientation is different from the second orientation. In various embodiments, the processing unit is configured to switch between the first antenna pair and the second antenna pair via the two or more multiplexers for receiving RF signals at different frequencies.

According to various aspects of the present disclosure, the software defined radio further includes a third antenna pair having a third distance and positioned at a third orientation, wherein the third distance is a physical distance between a fifth antenna and a sixth antenna of the third antenna pair, and the third distance is different from the first distance and the second distance.

In some embodiments, the first antenna pair, the second antenna pair, and the third antenna pair are each operatively connected to the two or more multiplexers for selecting between RF signals received via the first antenna pair, the second antenna pair, and the third antenna pair.

According to one aspect of the present disclosure, the third orientation is different from the first orientation and the second orientation. According to particular aspects of the present disclosure, the processing unit is configured to switch between the first antenna pair, the second antenna pair, and the third antenna pair via the two or more multiplexers for receiving RF signals at different frequencies. In one aspect, the first distance is less than half of a wavelength corresponding to the particular frequency.

According to various embodiments, prior to determining the first phase difference, the method further includes the steps of: extracting one or more data packets from the received RF signal; and analyzing the one or more data packets to determine if the received RF signal includes an RF communication emanated from a UAV source. In various embodiments, extracting one or more data packets from the received RF signal includes demodulating the RF signal. In particular embodiments, analyzing the one or more data packets from the received RF signal includes: performing a clock recovery process on the one or more data packets; performing a protocol decoder process on the one or more data packets; and validating a checksum included in the one or more data packets.

In a particular embodiment, analyzing the one or more data packets includes determining if the one or more data packets corresponds to known UAV signal patterns, and wherein the UAV source includes a UAV, UAV base station, or UAV controller. In some embodiments, the processing unit includes at least one central processing unit ("CPU") and at least one graphics processing unit ("GPU") for processing the RF signal.

According to various aspects of the present disclosure, a method is discussed for identifying unmanned aerial vehicle ("UAV") radio frequency ("RF") communication, including the steps of: tuning a receiver at a software-defined radio ("SDR"), wherein tuning the receiver includes configuring an antenna pair to receive RF data; receiving the RF data via the antenna pair, the RF data including one or more data packets that may be UAV RF communication; analyzing the one or more data packets of the RF data to determine if the RF data includes UAV RF communication; analyzing the phase difference of the RF data to determine possible angles of origination of the RF data; and upon determination of an angle of origination of the RF data, storing in a database that the received RF data and the phase difference are indicative of UAV RF communication.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary overview of the unmanned aerial vehicle tracking and monitoring system, according to one aspect of the present disclosure;

FIG. 2 illustrates the exemplary sensor ranges, according to one aspect of the present disclosure;

FIG. 3 illustrates exemplary sensor ranges and directed coverage, according to one aspect of the present disclosure;

FIG. 4 is a diagram illustrating an exemplary system architecture, according to one aspect of the present disclosure;

FIGS. 5A and 5B illustrate exemplary sensor devices, according to one aspect of the present disclosure;

FIG. 6 is a diagram illustrating an exemplary RF system, according to one aspect of the present disclosure;

FIG. 7 is a diagram illustrating an exemplary receiver chain, according to one aspect of the present disclosure;

FIG. 8 is a flowchart illustrating the exemplary frequency tuning process, according to one aspect of the present disclosure;

FIG. 9 is a flowchart illustrating the exemplary frequency analysis process, according to one aspect of the present disclosure;

FIG. 10 is a flowchart illustrating the exemplary UAV detection process, according to one aspect of the present disclosure;

FIG. 11 is a flowchart illustrating the exemplary phase analysis process, according to one aspect of the present disclosure;

FIG. 12 is a flowchart illustrating the exemplary compute phase difference process, according to one aspect of the present disclosure; and FIG. 13 is a diagram illustrating the exemplary antenna pair configuration, according to one aspect of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to systems and methods for detecting unmanned aerial vehicles (UAVs), and/or the controllers of UAVs, via radio frequency ("RF") analysis. In one embodiment, and in accordance with aspects of the present disclosure, UAVs may be controlled by radio frequency signals emitted from base stations (e.g., handheld remote controllers or stationary devices). These base stations may be located hundreds of meters away from the current location of the UAV, thereby making it difficult to determine the direction and origin of the RF signal, and thus the location of the base station. Furthermore, buildings, landscapes, and other obstructions may shadow or reflect RF signals from their original trajectory. Accordingly, an interceptor of a reflected RF signal may falsely determine that the signal originated from one direction, when it actually originated from a completely different direction, thereby making the origin of the signal difficult to locate. Furthermore, UAVs typically transmit data back to their corresponding base stations, thereby creating another opportunity for RF signals to be intercepted. According to particular embodiments, applying various methods of RF phase analysis and antenna pair switching as described herein allows for greater confidence when determining the direction of origin of intercepted RF signals.

In some embodiments, the RF functionality of the system described herein may be a particular portion of a larger system which may include a plurality of sensors for detecting, locating, and managing UAVs. In one embodiment, in addition to RF sensors, the system may include video sensors, audio sensors, Wi-Fi sensors, etc. In one embodiment, video sensors may be configured to "see" any approaching objects, and the sensors may record high definition video and detect objects approaching from 100 meters (or more) away (or other predetermined distances based on technical specifications of the video sensor). According to various aspects of the present disclosure, audio sensors may be configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information.

According to various aspects of the present disclosure, the RF sensor and receiver configuration discussed herein includes at least one software defined radio (SDR) which allows the RF sensor to be dynamically configurable to monitor various RF frequency ranges within the radio frequency spectrum, such as the RF frequencies commonly used to control UAVs. As will be understood to one of ordinary skill in the art, SDRs include a collection of hardware that, in an initial state, is generally inoperable until a user configures the hardware in a particular way, which is often a custom configuration. In various embodiments, a plurality of antennas may be either internally configured within the SDR or may be externally coupled to the SDR. In certain embodiments, particular antenna pairs and the RF signals they receive may be analyzed for phase differences, which in result may allow a user to determine the direction of origin of the RF signal. In one embodiment, the SDR included in the RF sensor may be configured to monitor subsets of frequencies across the entire radio frequency spectrum (3 kHz-300 GHz). In certain embodiments, the RF sensor (and other sensors) may collect it's respective data and process the data locally within the circuitry of the sensor. In other embodiments, the RF sensor collects the data and forwards the data to a central server which then processes the data.

One embodiment of the present disclosure generally relates to systems, methods, apparatuses, and devices configured to identify, track, and manage UAVs. These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

Referring now to the figures, for the purposes of example and explanation of the fundamental processes and components of the disclosed systems, methods, apparatuses, and devices, reference is made to FIG. 1, which illustrates an exemplary, high-level overview of one embodiment of an operational environment 100 in accordance with various aspects of the present disclosure. As will be understood and appreciated, the conceptual overview shown in FIG. 1 represents merely one approach or embodiment of the present system, and other aspects are used according to various embodiments of the present system.

In one embodiment, the exemplary operational environment 100 includes at least an Unmanned Aerial Vehicle Tracking and Monitoring System (UAVTMS) 102 and a plurality of installation locations 110A, 110B, and 110C. In various embodiments, the UAVTMS 102 is a central system combined with a plurality of sensors and other computer hardware and software operating to identify, track, and manage UAVs, as described in U.S. Pat. No. 9,805,273, entitled "Systems, Methods, Apparatuses, and Devices for Identifying, Tracking, and Managing Unmanned Aerial Vehicles," filed on Nov. 8, 2016, the disclosure of which is incorporated by reference herein in it's entirety. According to various aspects of the present disclosure, the UAVTMS 102 may be referred to herein as the central system or the central system and sensors. In particular embodiments, the central system is configured to accept data from the plurality of sensors indicated throughout as element 112, as well as various computing devices, databases, and other external sources of electronic data. The UAVTMS 102 may be further configured to process the various sensor readings and other data through a series of algorithms and computer implemented processes to identify, track, and manage UAVs. In general, all information from the installation locations may be directed to the central system of the UAVTMS 102 for processing and in some embodiments the UAVTMS 102 may convert the information from the external environments into meaningful data that can be used to further identify and track UAVs.

The disclosed systems, methods, apparatuses, and devices may be desirable in many situations and scenarios. For example, buildings and structures such as government buildings, prisons, universities, airports, sporting venues, personal homes, etc., require a safe and monitored airspace as well as surrounding area. The UAVTMS 102 disclosed herein may allow a plurality of sensors to monitor the airspace and general area surrounding buildings and structures, such as the buildings and structures mentioned above. Further, as UAVs continue to become more popular and acceptable in society, it may be desirable to be able to distinguish malicious UAVs (UAVs for spying, trespassing, etc.) from benign UAVs (UAVs for delivering consumer goods, etc.). In one embodiment, the UAVTMS 102 disclosed herein may be configured to monitor particular UAVs and store information regarding particular malicious and benign UAVs in order to better identify, monitor, and manage their presence in an airspace.

In some embodiments, the UAVTMS 102 may include at least a management module 104 and a database 106. As will be described in further detail in FIG. 4, the management module 104 may execute the computer implemented methods of processing data inputs and outputs, as well as analyzing whether or not an object is a UAV and further determine if it should be tracked, monitored, or otherwise responded to in another appropriate manner. The management module 104 may include hardware components such as a processor, computer executable instructions, a non-transitory computer readable medium wherein the computer executable instructions may be stored, etc. In the present embodiment, the management module 104 may share a bi-directional communication link with a database 106 which may allow for the two elements to send and receive data across the communication link as necessary. The database 106 included in the UAVTMS 102 may store any information pertaining to the processes performed by the management module 104. Examples of this information may include but are not limited to images of previously identified UAVs, audio files including data representing sound patterns of UAVs, information about objects that resemble UAVs but should not be mistaken for one, etc. According to various aspects of the present disclosure, the central system of the UAVTMS 102 may include modules such as the management module 104. Also, the management module 104 may include various servers, databases, and other computing hardware located either in a remote or central location. In one embodiment, the central system may operate as a cloud computing system. In other embodiments, the central system may be physically located in close proximity to the installation locations.

Continuing with FIG. 1 and as mentioned above, in some embodiments the UAVTMS 102 may be deployed at a plurality of installation locations, indicated throughout as 110A-110C, through networks 108. The networks 108 may be, but are not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hubs, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

As shown in the present embodiment, examples of installation locations may include airports 110A, prisons 110B, and residential homes 110C, whereby the installation locations 110A-110C may send and receive data over networks 108 to the central system of the UAVTMS 102. In some embodiments, the installation locations 110A-110C may provide the majority of data accepted by the UAVTMS 102. It should be understood by the discussion herein that the present disclosure should not be limited to installation locations described.

According to aspects of the present disclosure, the installation locations such as airports 110A, prisons 110B, residential homes 110C, or other structures and buildings may include a plurality of sensors 112A-112C deployed on the structure or building that communicate with the central server of the UAVTMS 102 over a network 108. In some embodiments, the plurality of sensors may communicate the sensor readings, over the network 108, to the UAVTMS 102 to be processed. In other embodiments, the sensor readings may be processed locally before being sent to the UAVTMS 102. In an example scenario, a UAV may be approaching a fenced enclosure adjacent to a prison 110B. This scenario may present a risk to the prison 110B, because the UAV may be carrying a payload that could be dangerous if it were to be delivered to a prison inmate. The plurality of sensors 112B deployed on the prison 110B may identify and track the UAV before it has the opportunity to drop the payload onto prison grounds or present a risk in another situation. In one embodiment, the UAVTMS 102 may identify and track the approaching UAV and alarm the prison guards to escort any inmates back into the prison 110B. In another embodiment, the prison 110B may exercise forceful action against the UAV, which may include overtaking the UAV's control system or disabling the UAV's ability to remain airborne. In other embodiments, the central system of the UAVTMS 102 operating at the prison 110B may simply track the UAV, and manage the UAV's identity within the central system of the UAVTMS in order to more easily recognize the UAV if it were to re-appear in the future.

In various embodiments, the sensors included in the plurality of sensors 112A-112C may be proprietary sensors or commercially available sensors. In particular embodiments, the video sensor included in the plurality of sensors 112A-112C is similar to the Lensation GmbH Lensagon B10M5425 lens coupled with an AR1820 CMOS sensor. In one embodiment, the video sensor has a dome-shaped configuration and is capable of recording 1080p resolution video within a wide angled field of view. According to various aspects of the present disclosure, the video sensor is configured to record activity within a field of view that a UAV would be expected to enter. For example, the video sensor may be pointed upward at the sky in anticipation of a UAV approaching from a high altitude. In some embodiments, a pre-installed stand-alone video sensor, such as pre-existing home/location security equipment, can be included in the plurality of sensors 112A-112C.

In various embodiments, the audio sensor may be a proprietary waterproof audio sensor designed to receive, amplify, and convert sound from audible vibrations to digital representations of a signal by implementing an analog to digital converter. According to various aspects of the present disclosure, the audio sensor may be capable of 24-bit sampling at various rates, such as 192 kHz.

In one embodiment, the Wi-Fi sensor may operate similarly to the Intel Corporation Dual Band Wireless-AC 3160 Wi-Fi card. In various embodiments, the Wi-Fi sensor is configured to detect wireless signals and more particularly Wi-Fi signals transmitting information such as Service Set Identifiers (SSID), Media Access Control (MAC) addresses, Received Signal Strength Indicators (RSSI), and other information regarding potential UAVs.

In various embodiments, the RF sensor may operate similarly to the Great Scott Gadgets HackRF One sensors, the Ettus USRP B210, or other similar sensors. In various embodiments, the RF sensor is configurable to operate within the 1 MHz to 6 GHz frequency range. In particular embodiments, the RF sensor may be configured to operate within any appropriate frequency range as defined by the particular hardware and software in operating on the device, such as the range of 433 MHz to 6 GHz.

In one embodiment, a user 118 operates a computing device connected to the central system of the UAVTMS 102 over the network 108. According to various aspects of the present disclosure, the user 118 may be a moderator or manager of a particular installation location 110A-110C. In some embodiments, the user 118 may be able to interact with or monitor the plurality of sensors 112A-112C at the installation locations 110A-110C. In an example scenario, a user may have a plurality of sensors 112C deployed on his/her home 110C and would like to monitor his/her surrounding property while away. Using a computing device such as a mobile phone, the user 118 could access the information regarding the plurality of sensors 112C deployed on his/her home 110C by logging into the central system of the UAVTMS 102 and accessing a control panel or dashboard. In various embodiments, accessing the control panel or dashboard allows for the user 118 to manage the plurality of sensors 112C at the installation location 110C as well as view real-time feeds from the video sensor, historical data from previous UAVs or non-UAVs that were detected by the central system and sensors 102, current maps representing particular sensor ranges, individual sensor diagnostics, and other relevant information regarding the identifying, tracking, monitoring, and managing of UAVs. In particular embodiments, there may be multiple deployments of a plurality of sensors 112C on the installation location 110C. In accordance with aspects of the present disclosure, the user 118 may manage multiple deployments of sensors 112C on one installation location 110C from the portal or dashboard. Also, the user 118 may manage multiple installation locations 110C from the portal or dashboard.

In some embodiments, the user 118 may use a computing device in order to access a web server or web application that may allow access to the central system of the UAVTMS 102. It should be understood from the discussion herein that any type of computing device such as a tablet, laptop computer, desktop computer, mobile phone, etc., could be used to access the central system of the UAVTMS 102 and the present disclosure should not be limited to the use of just a mobile phone.

In one embodiment, third party databases and data sources 120 are connected to the central system of the UAVTMS 102 over a network 108. These third party databases 120 may include a plurality of different datasets and sources of information pertinent to identifying and tracking UAVs, or maintaining a system as described in the present disclosure. As necessary, the central system of the UAVTMS 102 may write and read data to and from the third party databases 120. In various embodiments, it may be beneficial for the central system of the UAVTMS 102 to access information regarding UAV manufacturers and specifications in a third party database 120 in order to cross reference and verify the data collected by the plurality of sensors 112A-112C with the manufacturer's information. In a scenario where a UAV is approaching an airport 110A and the airport 110A has deployed a plurality of sensors 112A such as those described herein, the plurality of sensors 112A may be able to read signals from the approaching UAV and compare them to signals known to be emitted from certain UAVs of particular manufacturers. In other embodiments, the plurality of sensors 112A may transmit the detected signals to the central system of the UAVTMS 102 in order to compare the signals to other signal known to be emitted from certain UAVs of particular manufacturers. That information may allow the airport 110A to make an informed decision regarding how to respond to the approaching UAV. In some embodiments, information similar to the information available from third party databases 120 may already be stored in a database 106 included in the UAVTMS 102. However, including access to third party databases 120 may allow for the UAVTMS 102, as well as all parts of the disclosed system, to have access to the most recent information available in real time.

In the present embodiment, a third party database 120 is shown including relevant data and information 122 corresponding to but not limited to UAV updates, regulations, manufacturer specifications, and other general information. In one embodiment, this relevant data and information 122 may allow for the central system of the UAVTMS 102 to have access to data that may determine how the system may respond to UAVs. For example, the Federal Aviation Administration (FAA) may release new regulations regarding how UAVs may be operated in certain areas. This information may then automatically be updated in the third party database 120. This updated information may change how the system responds to a detected UAV flying at a certain height if operating a UAV at that height is made illegal based on new regulations.

In various embodiments, the relevant data and information 122 may include information pertaining to particular UAVs such as MAC addresses, particular communication frequencies, signal patterns, noise patterns, and other manufacturer-specific information regarding UAVs. By accessing the data and information 122 included in the third party database 120, the central system of the UAVTMS 102 may be able to more consistently and accurately identify, track, monitor, and manage UAVs.

Still referring to FIG. 1, in one embodiment, the plurality of sensors 112A-112C may be combined into one all-encompassing device. Devices such as that shown in FIG. 5A may include the plurality of sensors 112A-112C described in the discussion herein. According to various aspects of the present disclosure, the plurality of sensors 112A-112C may be a single sensor or many sensors enclosed in either one more multiple devices. Now referring back to FIG. 1, a device 112A may be installed on the air traffic control tower of the airport 110A in the present embodiment. In one embodiment, a device range 114A, represented as dotted lines and propagating from the device 112A, indicates the range that the device 112A may be able to detect UAVs within. In various embodiments, having a plurality of sensors included in one device may allow the ranges of each sensor to originate from the same location. In some embodiments, it may be beneficial to have a plurality of sensors included in one device and other sensors as stand-alone sensors if a particular area needs specific or customized coverage. In particular embodiments, the airport 110A may require multiple devices 112A in order to sufficiently cover a desired area or range. According to various aspects of the present disclosure, any appropriate sensor may be included in the device 112A, and the present disclosure should not be limited to the sensors listed and described.

In the present embodiment and continuing with the airport 112A external environment, a UAV 116A is shown within the dotted lines representing the device range 114A. According to aspects of the present disclosure, the UAV 116A may be detectable by one or more sensors included within the device 112A when the UAV 116A enters the device range 114A. Once within the device range 114A, the device 112A may transmit information regarding the UAV 116A to the central system of the UAVTMS 102 for processing. In certain embodiments, the device 112A may process the sensor readings locally. Once the information regarding the UAV 116A is processed by the UAVTMS 102, the UAVTMS 102 may then decide how to respond to the UAV 116A. Also in the present embodiment is an airplane 118A flying near the airport 110A. In one embodiment, the airplane 118A may enter a device range 114A. Similarly to when the UAV 116A enters the device range 114A, when the airplane 118A enters the device range 114A the device 112A may transmit information regarding the airplane 118A to the central system of the UAVTMS 102 for processing, or the processing may occur locally at the device 112A. As will be discussed in greater detail herein, when the UAV 116A and the airplane 118A are detected within the device range 114A, the central system and sensors in general do not know or have not confirmed the identity of these objects, but the UAVTMS 102 can quickly identify each object as a UAV or non-UAV by implementing the various systems and methods described in the present disclosure.

Continuing with FIG. 1 and according to aspects of the present disclosure, the devices 112A-112C can be used in many environments and installation locations in addition to those discussed herein. In various embodiments, devices such as 112A-112C may be deployed at locations such as hospitals, office buildings, universities, sporting venues, etc.

Turning now to FIG. 2, an exemplary portrayal 200 of sensor ranges around a location (e.g., an airport 110A) is shown according to one embodiment of the present disclosure. In the present embodiment, a RF sensor range 202A, video sensor range 202B, Wi-Fi sensor range 202C, and an audio sensor range 202D surround the airport 110A and may be propagated from a device 112A including the sensors. In the present embodiment, the device 112A is shown included on the air traffic control tower, but it should be understood from the discussion herein that the device 112A, or many devices 112A, may be deployed anywhere in or around the airport 110A. As will be described further below in the detailed description of FIG. 2, combining data from a plurality of sensors allows for the UAVTMS 102 to quickly identify a UAV in an area that may contain various non-UAV objects such as birds and planes that may trigger typical aerial monitoring devices.

In an environment such as the one shown in the present embodiment, it may be important to monitor and control the surrounding airspace. A situation may arise where a UAV is flying near the airport 110A runway and may strike an airplane, potentially causing damage to the airplane and risking the lives of the passengers. Another situation may arise where a particular military aircraft is intended to remain concealed within the confines of the airport 110A, and a UAV equipped with a camera may recognize the aircraft, resulting in a national security threat. In one embodiment, the RF, video, Wi-Fi, and audio sensors may all be configured to monitor their surroundings and prevent the above scenarios. For example, in the present embodiment a UAV 204A has entered the RF sensor range 202A, and therefore the UAV 204A may be detectable by the RF sensor. Also in the present embodiment, a UAV 204C has entered the RF sensor range 202A, video sensor range 202B, and the Wi-Fi sensor range 202C Wi-Fi, and therefore the UAV 204C may be detectable by each of those three sensors. In particular embodiments, if an object is detectable by multiple sensors, it may allow for the UAVTMS 102 to determine if it is a UAV faster than if the object was only detected by one sensor. According to various aspects of the present disclosure, each sensor is capable of monitoring the airspace between the sensor and its farthest extendable range.

In various embodiments, not all types of sensors are capable of extending equivalent ranges. According to aspects of the present disclosure, the ranges of the plurality of sensors may overlap until each sensor has reached it maximum range. For example, in the present embodiment, only the RF sensor is capable of detecting UAVs at its outermost range 202A, and all deployed sensors are capable of detecting UAVs at the audio sensor's outermost range 202D. In particular embodiments, overlapping sensor ranges may allow for the central system and sensors 102 to better identify and determine a UAV from a non-UAV such as a plane or a bird. However, according to various aspects of the present disclosure, the sensor ranges 202A-202D are not required to overlap, and some areas may be better monitored by using one particular sensor. In various embodiments, the described sensor ranges 202A-202D may vary from the current embodiment. For example, it is possible that the audio sensor range 202D may extend farther than the Wi-Fi range 202C based on configuration, hardware specifications, etc. Also, in one embodiment the video sensor may be configured to accept different lenses. Allowing the video sensor to accept different lenses may allow for the video sensor to record a larger field of view, record with increased clarity/resolution at farther distances, etc. In particular embodiments, certain sensor configurations allow for a wide spherical or dome-like range, while other sensor configurations monitor a more directed field of view. The present embodiment is only one configuration of sensor ranges and it should be understood from the discussion herein that there may be many configurations of different sensors and sensor ranges, and the examples shown herein are exemplary and for the purpose of discussion only.

FIG. 3 is a top plan view 300 of multiple buildings or structures at the prison installation location 110B with a plurality of devices 112B deployed thereon. In the present embodiment, the range 114B and direction of the sensor coverage is indicated by dashed lines propagating from the devices 112B. In one embodiment, this range 114B and direction may represent the area around a building or structure at the installation location 110B in which a UAV would be detectable. In some embodiments, each device 112B may be installed at certain angles and configurations in order to monitor a range 114B or a particular field of view or area. In particular embodiments, devices 112B are configured to monitor certain ranges 114B by taking into account vulnerable areas such as large open spaces around the installation location 110B, and other factors such as particular shapes and sizes of buildings in order to ensure that unnecessary amounts of coverage are not directed at locations that require less coverage, etc. According to the present embodiment, each device 112B may have a general range 114B, indicated by the dotted lines propagating from the devices 112B, wherein if a UAV were to enter then that UAV would be detectable. As mentioned previously in FIG. 2, each device 112B may be configured to include different sensors and different ranges 114B. This is shown, according to one embodiment, by the various device ranges 114B shown in the present embodiment. In various embodiments, one device range 114B may be twice as large as another device range 114B due to either particular configurations, the number of sensors included in the device 112B, the quality and specifications of the particular sensors included, etc. These devices 112B may have been configured to monitor particular areas surrounding the structures 110B in such a way that the area of coverage of all ranges 114B may be maximized. In various embodiments, by strategically choosing the location of installation for each device 112B, the coverage range may be optimized. According to various aspects of the present disclosure, the device ranges 114B may overlap and are not limited to a configuration of ranges such as the ranges shown in the present embodiment. It should be understood that the Wi-Fi sensors, and other sensors such as the RF sensors, operate omnidirectional in the horizontal plane.

Referring now to FIG. 4, an exemplary system architecture 400 is shown, according to one aspect of the present disclosure. In the present embodiment, the central system and sensors of the UAVTMS 102 are illustrated sharing a connection over a network 108. In greater detail, the sensors of the UAVTMS 102 are represented as individual devices 402A-402n including various numbers of sensors. As previously described in FIG. 1, a plurality of sensors (e.g., Wi-Fi, video, audio, RF, etc.) may be combined into an all-encompassing device 112, indicated in FIG. 4 as 402A-402n. The plurality of devices 402A-402n, each potentially configured to include a certain number of different sensors, may transmit sensor readings to the central system of the UAVTMS 102. In one embodiment, Device 1, indicated as 402A, includes three sensors labeled Sensor 1A, Sensor 1B, and Sensor 1C. It should be understood from the discussion herein that Device 1, indicated as 402A, may include various numbers of sensors of various types (e.g., Wi-Fi, audio, video, RF, etc.). Device 2, indicated as 402B, includes four sensors labeled Sensor 2A, Sensor 2B, Sensor 2C, and Sensor 2D. Device 1, indicated as 402A, may be substantially similar to Device 2, indicated as 402B, minus the one sensor that the two devices may not have in common, as shown in the present embodiment. In the present embodiment, a representation of additional devices, Device "n", is included and indicated as 402n. In some embodiments, as many devices as necessary or appropriate may be connected to the central system of the UAVTMS 102 over the network 108. In particular embodiments, the devices 402A-402n are installed at a plurality of locations which may be remote or local to the central system of the UAVTMS 102. Also operatively connected to the central system of the UAVTMS 102 may be a plurality of computing devices controlled by a user 118 such as, mobile devices 418A, remote servers and systems 418B, and personal computers 418C, etc. As described in FIG. 1, the computing devices controlled a user 118 may be connected to the central system of the UAVTMS 102 over a network 108 and may be configured to control or monitor the UAVTMS 102 and various locations of the deployed system and sensors, or analyze the information stored within the central system of the UAVTMS 102 by accessing a dashboard or portal. In some embodiments, computing devices such as third party databases 120 are connected to the central system of the UAVTMS 102 and may be configured to operate autonomously.

Continuing with FIG. 4, an embodiment of the UAVTMS 102 is represented in greater detail than previously shown in FIG. 1. In the present embodiment, the central system of the UAVTMS 102 includes the management module 104, a Drone/UAV DNA database 412, a system management database 414, and a web server 416 to be described below. In one embodiment, the management module 104 may be configured to intake the sensor information from the devices 402A-402n as transmitted over the network 108, then process and analyze the information in order to determine how to respond to a detected UAV. In various embodiments, the sensor information from devices 402A-402n may be processed locally at each device and then only certain results or values may be transmitted over the network 108 to the management module 104. In particular embodiments, the central system of the UAVTMS 102 may be local to the devices 402A-402n. In these particular embodiments, the processing of the sensor information would be performed locally which may eliminate the need to transmit information. In some embodiments, the data from the devices 402A-402n may be transmitted to the configuration module 404 represented in the management module 104. According to aspects of the present disclosure, the configuration module 404 may include the processes that interpret and analyze the data from the devices 402A-402n in order to determine if a UAV is present. The data may then be further transmitted to the module labeled aggregation 406. In one embodiment, the aggregation module 406 may include the processes that combine the results and values, such as confidence levels, from the configuration module 404 in order to determine if a UAV is detected. In the present embodiment, the two modules below the aggregation module 404 are labeled as "actions" 408 and "notifications" 410. In various embodiments, these two modules may represent the processes that determine if a UAV has been identified and how to respond accordingly. For example, processes operating within the aggregation module 406 may combine various confidence levels regarding UAV likelihoods and determine that a UAV is present in a particular area. Further, the processes operating within the actions module 408 may determine that the UAV is an unrecognized UAV and a system moderator should be alerted. Continuing with the example, the processes operating within the actions module 408 may forward the information regarding the identified UAV to the notifications module 410 which may then send an alert regarding the UAV to a user 118 of a user device.

In some scenarios, a particular sensor, such as a Wi-Fi sensor included in the UAVTMS 102, may detect a UAV with 100% (or near 100%) confidence. In this scenario, the configuration module 404 may transmit the information regarding the detected UAV directly to the actions 408 or notifications 410 modules without first transmitting information to the aggregation module 406 because the UAVTMS 102 has already established a 100% (or near 100%) confidence and no further processing is required.

Included in the management module 104 and also connected to by a bi-directional data path are the Drone/UAV DNA database 412 and system management database 414. These databases may include information pertaining to the systems and methods performed within the management module 104. The Drone/UAV DNA database 412 may include information that allows the disclosed system to better identify and track UAVs. In one embodiment, the Drone/UAV DNA database 412 may include meta-information regarding UAVs either compiled over time by the UAVTMS 102 or made available by UAV manufacturers, government agencies, or other organizations. This meta-information may be typical UAV weights, capabilities, and other technical specifications known about particular UAVs. In some embodiments, if a new UAV is detected by the system, the meta-information may be automatically uploaded to the Drone/UAV DNA database 412 to include the new information corresponding to the newly detected UAV. Similarly to the Drone/UAV DNA database 412, in various embodiments the system management database 414 may include information regarding UAV alerts, configurations, or other information regarding general system diagnostics. In particular embodiments, the databases included in the central system of the UAVTMS 102 may include any appropriate information for UAV identification, tracking, and monitoring and should not be limited to the information discussed herein. According to various aspects of the present disclosure, the databases included in the UAVTMS 102 may be cloud based, virtual, local, or any other appropriate form of computer memory.

Continuing with FIG. 4 and in one embodiment, the information stored in the databases 412 and 414, as well as the information processed by the management module 104 may be accessible through a web server 416. The web server 416 may include a bi-directional link between the management module 104, as well as bi-directional links between the at least one database included in the central system of the UAVTMS 102. The web server 416 may also include a bi-directional link and be operatively connected over the network 108 to the plurality of computing devices. In the present embodiment, the plurality of computing devices are indicated as 418A, 418B, and 418C. In the present embodiment, 418A, 418B, and 418C may connect directly to the web server 416 included within the UAVTMS 102. According to aspects of the present disclosure, the web server 416 may allow for the plurality of computing devices 418A, 418B, and 418C to access the data included in the UAVTMS 102. In certain embodiments, it may be useful for the computing devices 418A, 418B and 418C to have access to the web server 416 because the web server 416 may allow the information processed and stored within the UAVTMS 102 to be shared with the users 118 and monitors of the system. In one embodiment, the web server 416 may allow for the plurality of computing devices 418A, 418B, and 418C to access live feeds from sensors. Shown in the present embodiment, the web server 416 includes bi-directional links to all of the elements within the UAVTMS 102. In some embodiments, the web server 416 may handle the querying of information from the UAVTMS 102 and transmitting the queried information to the plurality of computing devices 418A, 418B, and 418C. However, it should be understood from the discussion herein that the computing devices shown in the present embodiment are not intended to limit the scope of the disclosure, rather they are intended to portray the various possible computing devices capable of communicating with the exemplary system.

As will be understood by one of ordinary skill in the art, the system, architectural components, and operative connections/communication pathways shown in these figures are intended to be exemplary only. In various embodiments, the architectural components of the systems and methods described herein may be distributed architectures (even though shown as a single component). In particular embodiments, the architectural components may be operatively connected in any suitable way.

According to one embodiment of the present disclosure, FIG. 5A is an exemplary sensor device 112, and FIG. 5B is an exemplary RF sensor device 510. Together, and in various embodiments, FIGS. 5A and 5B are exemplary hardware devices including the plurality of sensors, as described herein. In certain embodiments, a plurality of sensors may be included in one all-encompassing device, such as device 112, or various sensors can be standalone sensors, such as the RF sensor device 510. Although two examples of sensor devices are shown, in various embodiments it is possible to include all sensors in a single device.

Referring to FIG. 5A, a plurality of sensors are included in the device 112. The device 112 as shown in the present embodiment includes an X-shape with a circular center but it should be understood from the discussion herein that the device 112, and the RF sensor device 510, may have any shape and are not limited to the shapes as shown on FIG. 5. According to certain aspects of the present disclosure, the arms protruding from the circular center of the device 112 may house the included sensors. In one embodiment, the arms may be detachable and interchangeable so as to configure the sensor device 112 with an optimal number of each sensor. In other embodiments, the device 112 may include more or less than four arms, or no arms, in order to allow for various configurations of sensors. In the present embodiment, a video sensor 502 may be the circular center of the device 112. According to aspects of the present disclosure, the video sensor 502 may allow for the device 112 to capture and maintain a video stream of a particular field of view, as determined during configuration. In various embodiments, the video sensor 502 may capture 1080p HD resolution video and may be configurable within a 60-120 degree field of view, but also many other fields of view depending on particular device configurations. In one embodiment the video sensor 502 may also be capable of near infrared HD detection. Generally, the video sensor 502 allows for the device 112 to "see" the particular object in order to classify it as a UAV or non-UAV.

The arms indicated as 504 in the present embodiment may be audio sensors 504, according to aspects of the present disclosure. In certain embodiments, it may be desirable for a particular device to include more than one sensor for reasons such as adding range, accuracy, consistency, or overall better coverage around a particular monitored area when detecting UAVs. In the present embodiment, the device 112 includes two audio sensors 504. In various embodiments, the audio sensors 504 may be capable of detecting stereo audio, which includes audible sonic and ultrasonic frequencies, ranging between 0-96 kHz, but it should be understood from the discussion herein that the audio sensors 504 may be configured to monitor any appropriate frequency range. Generally, the audio sensor 504 allows for the device 112 to "hear" the particular object in order to classify it as a UAV or non-UAV.

Continuing with FIG. 5A, the device 112 as shown in the present embodiment includes at least one Wi-Fi sensor 506. In various embodiments, UAVs may be connected over Wi-Fi to a wireless local area network (WLAN). In one embodiment, including a Wi-Fi sensor 506 on the device 112 may allow for any UAV being controlled and/or being accessed over Wi-Fi to be detected.

It should be understood from the discussion herein that any type of appropriate sensor that could be useful in identifying, tracking, and managing UAVs may be included in the device 112, and this is indicated at device arm 508 labeled "other". In various embodiments, examples of these "other" sensors might include high-resolution thermal imaging sensors and radar sensors operating in the ISM-band (Ultra-Wide Band and mmWave-Radar) for detecting UAVs based on heat emissions or particular frequency ranges. In certain embodiments, PTZ-Cameras (EO and Thermal) may be included in order to increase the range of video-based identification and tracking of UAVs. In certain embodiments, device 112 and the attached sensor arms 502, 504, 506, and 508 may include on device computing capabilities and computer memory/storage in order to perform the various processes and functions described herein relating to identifying, tracking, and managing UAVs.

Referring now to FIG. 5B, a single RF sensor device 510 is shown, according to one aspect of the present disclosure. The RF sensor device 510 may be a standalone sensor, as shown in the present embodiment, or it may be included in the device 112. In one embodiment, the RF sensor may be capable of scanning various industrial, scientific, and medical (ISM) bands, as well as other frequency bands, and detecting signals therein. In certain embodiments, the RF sensor may continuously scan and detect analog-modulated or digitally-modulated video signals, 5 GHz video signals, control signals, telemetry signals, or signals on any other appropriate carrier frequency and/or frequency range, and further decode the signals. According to aspects of the present disclosure, some UAVs are equipped with video cameras and may transmit the video signals back to a base station or computing system to be viewed by the UAV operator/controller. In various embodiments, a base station may be a physical remote-control, a smart phone, a video-receiver, or a similar device. In one embodiment, these video signals transmitted from the UAV to a base station may provide information regarding the location of a UAV or the UAV controller, which may aide in the identifying and tracking of the UAV. In certain embodiments, the RF sensor device 510 is configured to detect these signals and extract any information from the signal regarding the presence of a UAV. In some embodiments, the range of an RF sensor such as the RF sensor device 510 may extend to about 500 meters; however, it should be understood from the discussion herein that the range of the RF sensor device 510 may vary according to various configurations (e.g., the range of the RF sensor device 510 may extend well beyond 1500 meters). It should be understood that the various sensors described herein are exemplary, and any type of sensor that may be useful in identifying, tracking, and managing UAVs may be included in the present system.

Continuing with FIG. 5B, and in one embodiment, the distance between the two antennas shown in the present embodiment may be a particular distance at a particular orientation for calculating a phase difference of an RF signal (or other signal type) detected via the each of the two antennas.

Turning now to FIG. 6, a diagram of an exemplary RF sensor configuration 602 (also labeled in FIG. 6 as the RF 300) is shown, according to one aspect of the present disclosure. The RF sensor configuration 602, as shown in the present embodiment, may be included in the RF sensor device 510 described immediately above in the discussion of FIG. 5B. According to various aspects of the present disclosure, the exemplary RF sensor configuration 602 is designed to receive RF signals, and further process the signals to analyze various aspects of the signal (such as data packets, phase differences, etc.) to determine if the signal is indicative of a UAV and also from where the signal originated. Furthermore, and as mentioned above, the RF sensor 510 includes at least one software defined radio (SDR 604). As shown in the present embodiment, in addition to including a SDR 604, the RF sensor configuration 602 also includes, but is not limited to including, a system controller 606, and a Power Over Ethernet (POE) splitter 608. In various embodiments, a plurality of RF antennas 610 operatively connected to the SDR 604 may receive RF signals from various sources. In response to receiving the RF signals, the SDR 604 may perform signal processing techniques on the RF signal, such as applying a single filter or a chain of several filters (e.g., one or more low-pass filters, high-pass filters, band-pass filters, etc.), before transmitting the processed RF signal to the system controller 606. In one embodiment, the system controller 606 includes components such as an embedded computing board 612, RAM 614, an Ethernet module 616, and a power supply and converter (DC/DC) 618. According to various aspects of the present disclosure, the embedded computing board 612 may include central processing units, or CPUs, (e.g., ARM Cortex-A57, ARM V8 Denver, etc.) for processing and executing instructions, graphics processing units, or GPUs (e.g., NVIDIA Pascal) for specialized processing, and Wi-Fi hardware (and a corresponding Wi-Fi antenna 620) for detecting Wi-Fi controlled UAVs. In various embodiments, the combination of CPUs and GPUs in the system controller 606 allows for the RF sensor configuration 602 to process more data at faster speeds, rather than if the system controller 606 included only CPUs or GPUs. Furthermore, and according to one embodiment, a POE splitter 608 may be operatively connected to the system controller 606 for connecting the system controller 606 to other components, such as various computing systems (e.g., UAVTMS 102).

Referring now to FIG. 7, a diagram illustrating an exemplary receiver chain of the software defined radio 604 is shown, according to one embodiment of the present disclosure. In one embodiment, the receiver chain shown in FIG. 7 is a more detailed diagram of the SDR 604 show in FIG. 6, illustrating the particular hardware components configured to process the RF signals received at the RF antennas 610. Referring to the left-most portion of the diagram shown in the present embodiment, in response to RF signals being intercepted by the RF antennas 610, the RF signals may be processed through one or more multiplexers 702. In particular embodiments, multiplexers allow for a single signal from multiple analog or digital signals to be selected. According to various aspects of the present disclosure, the multiplexers 702 shown in the present embodiment may operate as a switch for selecting particular RF signals received at the RF antennas 610. For example, if two RF antennas 610 each receive an RF signal, multiplexer may only allow one of the received signals to proceed to be processed by the system circuitry.

Continuing with the present embodiment, the output from the one or more multiplexers 702 may be inputted into a series of amplifiers 704. In a particular embodiment, the series of amplifiers 704 may include low-noise amplifiers (LNAs) which may amplify a low power RF signal without significantly degrading the signal-to-noise ratio. In various embodiments, the output of the series of amplifiers 704 may be inputted into a signal mixer 706. In one embodiment, the signal mixer 706 combines the signal output from the series of amplifiers 704 with an oscillated signal generated by a local oscillator including the combination of a phase locked loop 710 (PLL) and a voltage controller oscillator 712 (VCO), coupled with a phase shifter 708 (0/90 degrees) for providing either 0 degree or 90 degree shifted signals to the receiver chains.

In various embodiments, the particular SDR 604 receiver chain shown in the present embodiment applies a band pass filter 714 to the RF signal, which allows for all frequencies except for a particular range of frequencies to be removed from the RF signal. In response to filtering the RF signal for a particular signal band, the RF signal may be transformed from analog data to digital data via one or more analog to digital converters 716 (e.g., ADC). In a particular embodiment, a tunable oscillator 718 may control the sample timing of the one or more ADCs 716.

In various embodiments, a digital down-converter 720 (e.g., DDC) may also be included in the SDR 604 receiver chain for converting the signal band to a lower frequency at a lower sampling rate in order to make subsequent processing more efficient without sacrificing the signal information. According to various aspects of the present disclosure, and in response to the DDC 720 converting the RF signal data to a lower frequency, the RF signal data may be transmitted to the system controller 606 by the transport and control module 722 for further processing, which will be described in greater detail below.

FIG. 8 is a flowchart illustrating the frequency tuning process 800, according to one aspect of the present disclosure. In various embodiments, the frequency tuning process 800 is a continuous process where a receiver is tuned to receive signals at a particular frequency range, the system performs packet-based processing on the received signals, and the receiver is continually tuned for different frequencies and implementing different antenna pairs. In one embodiment, the result of the frequency tuning process is a packet-based process wherein particular portions, or packets, of a detected RF signal are processed to determine if the RF signal is indicative of a UAV. In various embodiments, the disclosed systems and methods include antenna switching, which reduces the reliance on expensive antenna hardware such as large antenna arrays. Generally, antenna arrays are large structures of connected antennas that are fixed in their configuration, and these antennas operate in combination to transmit or receive signals. In particular embodiments, the tuning and switching of antenna pairs as described herein allows for multiple antenna pairs to be configured via the SDR 604, either simultaneously or in sequence, to operate similarly to an antenna array, however more efficiently, effectively, and at a lower cost. As will be understood by one of ordinary skill in the art, conventional systems require multiple antennas (e.g., four or more) and one receiver chain per antenna (a very costly configuration). As mentioned briefly above, the multiplexers 702 allow for the present system to switch between signals received via the antenna pairs 610, and the switching occurs at approximately 1 ms intervals, thereby allowing the system to switch between various antenna pairs 610 for detecting UAVs across various frequency ranges without potentially missing a UAV as a result of monitoring one frequency range for too long of a time period (e.g., the disclosed system reuses hardware for utilizing multiple antenna pairs).

According to one embodiment, the process begins at step 802, where the SDR 604 receiver chain is tuned and a particular frequency with a corresponding bandwidth is selected (e.g., a particular frequency range). In various embodiments, tuning the SDR receiver chain and selecting a particular frequency to be analyzed may include configuring the SDR 604 receiver chain shown in FIG. 7. For example, the local oscillator may be tuned to a particular center frequency that is to be processed, and the band-pass filter may be adjusted to allow for processing a particular bandwidth around the selected frequency. In response to tuning the SDR 604 receiver chain and selecting a frequency, the process further proceeds to the frequency analysis process 900, which will be discussed in greater detail below in the discussion of FIG. 9.

In one embodiment, the output from the frequency analysis process 900 may include one or more data samples that have been analyzed for determining if the data samples are indicative of a UAV. In various embodiments, at step 804 of the frequency tuning process 800, if it is determined that the data samples are indicative of a UAV data packets, the frequency tuning process 800 loops back into the frequency analysis process 900 to continue analyzing the current RF signal. If it is determined that the data samples outputted from the frequency analysis process are not indicative of a UAV, the process may proceed to step 806 where it is determined if there are more frequencies to select. In one embodiment, if it is determined that there are more frequencies to select, the process 800 may jump to step 802, where the SDR 604 receiver chain is tuned for a particular frequency or range of frequencies. In certain embodiments, if it is determined at step 806 that there are no more frequencies to select, the process 800 may terminate.

Turning now to FIG. 9, a flowchart illustrating the exemplary frequency analysis process 900 is shown, according to one aspect of the present disclosure. In various embodiments, the frequency analysis process 900 includes processing and analyzing particular frequencies extracted or filtered from the RF signal detected at the one or more RF antennas 610. As mentioned briefly above in the discussion of the exemplary SDR 604 receiver chain, the RF signal may be converted from an analog signal to a digital signal. In one embodiment, this occurs at step 902 and includes processing the RF signal at the ADC 716. In response to converting the RF signal to a digital representation of the analog RF signal, the process 900 may proceed to step 904 where the digital data is filtered, which allows for particular frequencies to be selected from the digitally converted RF signal. In some embodiments, filtering the digital data includes performing mathematical transformations on a discrete portion of the digital data. In certain embodiments, at step 904 the system may perform an impulse response, such as a finite impulse response (FIR) or an infinite impulse response (IIR).

In one embodiment, at step 906 the filtered data samples may optionally be stored. In certain embodiments, storing the data samples may allow for the system to further process the samples at a later time, or may allow for the system to leverage the stored data to increase the confidence of determinations made about other data samples. For example, once a valid UAV transmission packet is detected, the system may look up the original data samples for calculating the correct phase measurements.

According to various aspects of the present disclosure, in response to filtering the data at step 904, or in some embodiments storing the stored data samples at step 906, the process may proceed to the UAV detection process 1000. As will be described below in the discussion of FIG. 10, the UAV detection process may include demodulating the RF signal to extract and analyze the signal contents, and then further compare the signal contents to signal patterns that are known to be indicative of a UAV or UAV communication.

In various embodiments, the output from the UAV detection process 1000 is analyzed at step 908 to determine if UAV communication was detected. In particular embodiments, if UAV communication was detected at step 908, the frequency analysis process 900 may proceed to step 910 where original data relating to the analyzed sample(s) is retrieved. For example, the RF antennas 610 may intercept RF signals including a plurality of data samples; however, the system may analyze one sample to determine if the RF signal is indicative of UAV communicated UAV data packets. Continuing with this example, the unprocessed samples may be stored, such as at step 906, and in response to determining that UAV communication was detected, the remaining samples may be retrieved at step 910 to further extract information regarding the nature of the detected RF signal. In some embodiments, if it is determined that UAV communication is not detected, the process 900 may terminate.

In response to retrieving the originally filtered data samples at step 910, the data samples may be further inputted into a phase analysis process 1100, which will be discussed in greater detail below in the description of FIG. 11. In one embodiment, the output from the phase analysis process 1100 may include processed RF data indicating a difference in phase between two RF signals (or the same RF signal) received at two RF antennas 610 of a particular antenna pair. In various embodiments, the RF data indicating a difference in phase between two RF signals may be inputted to step 912, where the direction of the detected signal is determined. According to particular embodiments, the direction of the detected signal may be determined by comparing possible origination directions of the signal, as produced by two separate antenna pairs, to identify a common origination direction. In one embodiment, each RF signal detected via a particular antenna pair may produce a set of one or more possible origination directions for the detected RF signal. In certain embodiments, implementing a second antenna pair to detect the same RF signal may produce an additional set of one or more possible origination directions for the detected RF signal. According to various aspects of the present disclosure, comparing each set of one or more possible origination directions may yield a common origination direction between the two sets, which may be the true/actual origination direction of the signal.

FIG. 10 is a flowchart illustrating the UAV detection process 1000, according to one aspect of the present disclosure. In one embodiment, the UAV detection process 1000 includes comparing received RF signal data to known UAV signal data patterns, and separating different RF communication channels (e.g., a channel for communication from the base station and a channel for communication from the UAV), using particular RF data analysis methods such as but not limited to clock recovery, protocol decoding, and computing checksums. Prior to performing such analysis methods, the UAV detection process 1000 may begin at step 1002, where the system may demodulate the RF signal data. As will be understood by one of ordinary skill in the art, demodulation of data generally includes extracting particular portions of data from a larger collection of data (e.g., one or more signals are modulated into a carrier frequency prior to transmission, and later demodulated for extraction by a receiver). In some embodiments where modulation schemes of detected signals are unknown and demodulation is not possible, methods such as envelop detection are used for determining if the patterns of transmission bursts match the patterns of known UAV signals.

In one embodiment, and in response to demodulating the data at step 1002, the UAV detection process 1000 may optionally proceed to steps 1004, 1006, and/or 1008 for further processing the demodulated data. In a particular embodiment, the optional step 1004 includes a clock recovery process. According to various aspects of the present disclosure, clock recovery includes generating an approximate clock frequency based on the received data. In various embodiments, the receiver generates the clock frequency by phase aligning the clock frequency (commonly referred to as synchronization) with the received data, and the received data may be sampled according to the generated clock in order to produce a data stream that may be further analyzed to detect if the data stream is indicative of UAV communication. In certain embodiments, the receiver generates the clock frequency by utilizing a control loop to estimate the ideal sampling point for each symbol (commonly referred to as timing synchronization), and the received data may be digitally resampled according to the generated clock in order to produce a data stream that may be further analyzed to detect if the data stream is indicative of UAV communication.

The optional step 1006 includes a protocol decoder process, according to one aspect of the present disclosure. In various embodiments, protocol decoding includes analyzing the received RF signal data for aspects of the signal data that may allow for the signal to be decoded, such as analyzing the signal data for a particular header as well as removing channel coding schemes such as line coding, error coding or data compression, etc. Generally, signals may include a header with a particular pattern of bits according to the particular communication protocol. In one embodiment, the header may include information such as a start bit for alerting a receiver that a transmission is following the header, information relating to the type of data included in the data packets, the type of transmission, a device identification number, etc. In certain embodiments, detecting these patterns may allow for the receiver to recognize the protocol used for the packet transmission. In some embodiments, detecting the particular protocol of the intercepted RF signal allows for a receiver to determine how to further decode the signal payload, analyze the signal with a high degree of confidence, and in some cases track a detected UAV via a detected identification number.

In various embodiments, the optional step 1008 includes a compute checksum process. Generally, checksums are function-calculated values included with data transmissions that are representative of the contents of the data transmission and used to ensure transmission fidelity. For example, prior to transmission, data may be inputted into a checksum generator and the checksum may be included in the data transmission. The receiver may input the received data into the same checksum generator, and if the checksums match then the receiver may analyze the received data with a high degree of confidence.

According to various aspects of the present disclosure, in response to demodulating the data at step 1002, as well as optionally processing the data at steps 1004, 1006, and 1008, the UAV detection process may proceed to step 1010, where it is determined if the demodulated data (or detected signal envelop from the envelop detection method) matches known UAV patterns. In particular embodiments, this step compares the analyzed data to known and stored UAV signal patterns and establishes a determination if the received signal is indicative of a UAV. In some embodiments, this step may require only one data packet (or a portion of the data packet) to be processed and analyzed, rather than all of the data included in a received RF signal. Accordingly, the system may determine if particular signals are indicative of UAV communication with greater efficiency and less computing resources.

FIG. 11 is a flowchart illustrating the exemplary phase analysis process 1100, according to one aspect of the present disclosure. In various embodiments, and as mentioned in the discussion of FIG. 6, the SDR 604 may include RF antennas 610 for intercepting RF signals. In some embodiments, for example, the SDR 604 may include four antennas operatively connected to two multiplexers 702, thereby generating four possible antenna pairs for detecting RF signals (assuming the multiplexers 702 are two-port switches). In one embodiment, a single RF signal may be intercepted by two RF antennas 610, or a particular antenna pair. According to various aspects of the present disclosure, a single antenna pair may be configured to receive the RF signals, or a plurality of antenna pairs may be configured to receive the RF signals and a particular antenna pair may be selected for processing the signal received at that particular pair. In one embodiment, at step 1102 of the phase analysis process 1100 an antenna pair may be selected for analyzing the phase of the RF signals detected at the particular selected pair. In response to selecting the antenna pair at step 1102, the phase analysis process 1100 may proceed to the compute phase difference process 1200 for calculating a difference in phase between the signals received at each antenna in the antenna pair, which will be described in detail below in the discussion of FIG. 12. Briefly, however, the compute phase difference process 1200 includes calculating a difference in phase (e.g., signal timing) in order to make a determination about the origin or direction of the signal, according to various aspects of the present disclosure. In one embodiment, and in response to computing the phase difference between the RF signals received at the particular antenna pair, the system may compute the possible angles for phase difference between the selected antenna pair at step 1104. In various embodiments, the possible angles calculated at step 1104 are representative of the possible directions from which the RF signals may have originated, according to at least the difference in phase, and also in some embodiments the orientation and spacing of the antenna pair.

In various embodiments, at step 1106, the data corresponding to the computed angles from step 1104 may be annotated. In one embodiment, annotating the data may include adding additional information to the data such as a timestamp, the detected signal strength, the detected protocol, transmitted identifiers, the particular frequency the data was detected on, etc. In a particular embodiment, the computed angles from step 1104 in combination with the annotations from step 1106 may provide the system with more information for making a determination regarding the direction or origin of the detected signal.

In a particular embodiment, the annotated data from step 1106 may be combined with pre-existing data at step 1108. According to various aspects of the present disclosure, combining the computed phase difference possible angles and annotated data with pre-existing data may include fetching previously stored data from prior detected and analyzed RF signals and further comparing various aspects of the signals (such as frequency, signal strength, protocols, identifiers, etc.) to determine the probability that the signals are of similar origin.

At step 1110, if the combined data from step 1108 is consistent with or substantially matches other data from previously analyzed UAV signals, then the process may proceed to step 1112 to select the dominant phase angle. In some embodiments, the dominant angle may include the computed angle that best matches stored data from the step 1110, or the angle with the highest confidence of being indicative of the signal origin. If it is determined at step 1110 that the combined data from step 1108 is not consistent with or does not substantially match with other data from previously analyzed UAV signals then the process may proceed to step 1114, where it is determined if there are additional antenna pairs to analyze.

In one embodiment, the receiver as shown and described in FIG. 6 may include a plurality of antennas, and particular pairs of antennas may be configured to detect RF signals at particular times. In some embodiments, and at step 1114, if additional antenna pairs were active during a particular time period when a RF signal was received, the system may retrieve the stored packets corresponding to the RF signal received at the additional antenna pair to analyze the signal for possible angles based on phase difference, similarly to the processes described above and herein. In various embodiments, if no additional antenna pairs are available, the phase analysis process 1100 may terminate.

FIG. 12 is a flowchart illustrating the compute phase difference process, according to one aspect of the present disclosure. In one embodiment, the compute phase difference process 1200 begins at step 1202 where a particular data subset (e.g., a particular portion of the detected packets) is chosen to be processed based on the packet transmission and selected antenna pair.

Continuing with the compute phase difference process 1200, at step 1204, the system may optionally reduce or limit the size of the data subset if any of the optional steps 1004, 1006, and/or 1008 are executed in the UAV detection process 1000. According to certain aspects of the present disclosure, reducing the data subset may limit the necessary data to be processed by the system, therefore increasing the efficiency of the system.

In one embodiment, in response to selecting the data subset to be processed at step 1202 (and/or the optional step 1204 including reducing the data subset), the compute phase difference process 1200 may proceed to step 1206 where a phase difference algorithm is selected. In some embodiments, the phase difference algorithms may be open source and publicly available; however, proprietary algorithms may also be used. In a particular embodiment, algorithms and techniques such as null steering (or zero-forcing) may be used for calculating phase differences; however, techniques such as MUSIC and ESPRIT, and also Capon's method, may also be used to determine a signal's direction of arrival from antenna array/pair measurements.

At step 1208 and according to one embodiment, in response to selecting a phase difference algorithm at step 1206, the phase difference is computed according to the selected algorithm. In various embodiments, the phase difference is a measure of the off-set distance between corresponding peaks in two waves of substantially similar frequencies. In a particular embodiment, the phase difference may range anywhere between a measure of 0 radians and 2*Pi radians, depending on the angle of arrival of the detected wave(s).

At step 1210, and according to one aspect of the present disclosure, a phase difference confidence is determined in response to computing the phase difference at step 1208. In various embodiments, the particular measured phase difference, in combination with other factors such as the data annotations from step 1106 of FIG. 11, may confidently indicate detection of a UAV or the direction of origin of a UAV signal, or generally any RF signal. In particular embodiments, measurements such as the difference in signal strength between antennas or channels, and also the standard deviation of the phase differences, may be considered when determining the confidence of the computed phase difference.

In various embodiments, the computed confidence measure may be compared to a predetermined threshold at step 1212. In particular embodiments, a confidence measure below the predetermined threshold may result in the computed phase difference being rejected at step 1214. In some embodiments, the phase difference measurements rejected at step 1214 may be the result of multi-path propagation, or general signal interference. In other embodiments, a confidence measure above the predetermined threshold may result in the computed phase difference being stored at step 1216 for tracking and/or further processing of the detected RF signal. In some embodiments, examples for determining if a particular phase difference should be rejected include scenarios when the difference between the inter-pair signal magnitude is larger than 8 dBFS (decibels relative to full scale), or when the difference between the current phase difference and a previously calculated phase difference (e.g., 3 seconds earlier) is larger than 0.8 radians.

Looking now at FIG. 13, an exemplary antenna pair configuration is shown, according to one aspect of the present disclosure. It should be understood that the antenna pair configuration shown is exemplary and for illustrative purposes only. As shown in the present embodiment, two radio frequency waves, a 2.4 GHz wave and a 5.7 GHz wave, are shown directed towards the antenna pair (e.g., RF antennas 610) operatively connected to the RF 300 receiver configuration. In one embodiment, in order to effectively calculate the phase difference between one of the intercepted RF waves (e.g., either the 2.4 GHz wave or the 5.7 GHz wave) at the two antennas, the distance between each antenna in the antenna pair should be less than half of the wavelength of the intercepted RF wave. For example, the wavelength of the 2.4 GHz wave is 124 mm, therefore the antenna pairs selected for receiving the 2.4 GHz wave should be separated by 62 mm or less. Furthermore, the wavelength of the 5.7 GHz wave is 52 mm, therefore the distance between the antennas in the antenna pair selected to receive the 5.7 GHz wave should be separated by 26 mm or less. This distance of separation is shown as D in the present embodiment. As will be understood by one of ordinary skill in the art of RF signal processing, the phase difference of a signal is equal to two pi multiplied by the path difference divided by the wavelength of the signal, where the path difference is equal to the distance between the antennas multiplied by the sine of the angle of the wave front in relation to the line through the antenna midpoints (or a particular orientation of the antennas). In one embodiment, two antenna pairs may have different orientations such that lines drawn between the midpoints of the antennas in each antenna pair (if extended infinitely) would intersect at some point (although in some embodiments, antenna pair orientations may be parallel). In various embodiments, including antenna pairs with different orientations allows for the system to determine an actual/true origination direction via comparing the one or more possible origination directions provided by each antenna pair detecting a particular RF signal. Accordingly, configuring the antenna distance to be smaller than half of the wavelength allows for inverting the above mathematical relationship to compute the angle of the wave front from the measured phase difference. Furthermore, it is known that inverting a sine results in phase difference measurements that may be ambiguous when determining the direction of origination of a transmitted wave (e.g., determining if the wave was transmitted from the front or rear of the antenna pair). In one embodiment, configuring the antenna distance to be smaller than half of the wavelength reduces ambiguity and allows for the ambiguity to be resolved by switching antenna pairs. Additionally, in various embodiments, this configuration allows for the system to effectively determine phase difference with a minimal number of antennas, minimal number of receivers, and a generally low-cost form factor.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system, comprising:
    a first antenna pair having a first distance and positioned at a first orientation, wherein the first distance is a physical distance between a first antenna and a second antenna of the first antenna pair, and wherein the first distance and the first orientation are for determining an actual origination direction of an RF signal;
    a second antenna pair comprising a second distance and positioned at a second orientation, wherein the second distance is a physical distance between a third antenna and a fourth antenna of the second antenna pair;
    at least one multiplexer configured to select between RF signals received via the first antenna pair and the second antenna pair; and
    a processing unit operatively connected to the first antenna pair, wherein the processing unit includes at least one processor configured to:
        configure the first antenna pair to receive the RF signal at a particular frequency;
        receive the RF signal via the first antenna and the second antenna of the first antenna pair;
        determine a first phase difference between the RF signal received via the first antenna and the RF signal received via the second antenna;
        in response to determining the first phase difference, calculate a first set of at least one origination direction of the RF signal based on the first phase difference, the first distance, and the particular frequency;
        receive, via switching the at least one multiplexer to the second antenna pair, the RF signal via the third antenna and the fourth antenna of the second antenna pair;
        determine a second phase difference between the RF signal received via the third antenna and the RF signal received via the fourth antenna;
        in response to determining the second phase difference, calculate a second set of at least one origination direction of the RF signal based on the second phase difference, the second distance, and the particular frequency; and
        compare the first set of the at least one origination direction to the second set of the at least one origination direction to determine a common origination direction, wherein the common origination direction corresponds to the actual origination direction of the RF signal.

2. The system of claim 1, wherein the at least one processor is further configured to switch between the first antenna pair and the second antenna pair via the at least one multiplexer for receiving RF signals at different frequencies.

3. The system of claim 1, wherein the first distance is equidistant to the second distance.

4. The system of claim 1, further comprising a third antenna pair having a third distance and positioned at a third orientation, wherein the third distance is positioned at a physical distance between a fifth antenna and a sixth antenna of the third antenna pair, and the third distance is different from the first distance and the second distance.

5. The system of claim 4, wherein the first antenna pair, the second antenna pair, and the third antenna pair are each operatively connected to at least one multiplexer for selecting between RF signals received via the first antenna pair, the second antenna pair, and the third antenna pair.

6. The system of claim 4, wherein the third orientation is different from the first orientation and the second orientation.

7. A system, comprising
a first antenna pair having a first distance and positioned at a first orientation, wherein the first distance is a physical distance between a first antenna and a second antenna of the first antenna pair, and wherein the first distance and the first orientation are for determining an actual origination direction of an RF signal;
a processing unit operatively connected to the first antenna pair, wherein the processing unit includes at least one processor configured to:
configure the first antenna pair to receive the RF signal at a particular frequency;
receive the RF signal via the first antenna and the second antenna of the first antenna pair;
determine a first phase difference between the RF signal received via the first antenna and the RF signal received via the second antenna;
in response to determining the first phase difference, calculate a first set of at least one origination direction of the RF signal based on the first phase difference, the first distance, and the particular frequency;
identify a modulation scheme associated with the RF signal;
compare the modulation scheme to a plurality of known modulation schemes; and
on determining that the modulation scheme differs from the plurality of known modulation schemes, identify, via an envelope detection technique, that a pattern of transmission bursts associated with the RF signal matches one of a plurality of known patterns of transmission bursts.

8. The system of claim 1, wherein the at least one processor is further configured to demodulate the RF signal by extracting at least one data packets from a plurality of data packets transmitted through the RF signal.

9. The system of claim 8, where in the at least one processor is further configured to analyze the at least one data packets from the plurality of data packets to identify a UAV source by detecting a known UAV signal pattern from a plurality of known UAV signal patterns, the UAV source comprising, a UAV, a UAV base station, or a UAV controller.

10. A method, comprising: configuring, via a processor, a first antenna pair to receive an RF signal at a particular frequency, wherein the first antenna pair comprises a first distance and is positioned at a first orientation, the first distance being a physical distance between a first antenna and a second antenna of the first antenna pair, and wherein the first distance and the first orientation are for determining an actual origination direction of the RF signal; receiving the RF signal via the first antenna and the second antenna of the first antenna pair; determining, via the processor, a first phase difference between the RF signal received via the first antenna and the RF signal received via the second antenna; in response to determining the first phase difference, calculating, via the processor, a first set of at least one origination direction of the RF signal based on the first phase difference, the first distance, and the particular frequency; configuring, via the processor, a second antenna pair to receive the RF signal, wherein the second antenna pair comprises a second distance and positioned at a second orientation, and wherein the second distance is a physical distance between a third antenna and a fourth antenna of the second antenna pair; selecting, via at least one multiplexer, between RF signals received via the first antenna pair and the second antenna pair; receiving, via switching the at least one multiplexer to the second antenna pair, the RF signal via the third antenna and the fourth antenna of the second antenna pair; determining, via the processor, a second phase difference between the RF signal received via the third antenna and the RF signal received via the fourth antenna; in response to determining the second phase difference, calculating, via the processor, a second set of at least one origination direction of the RF signal based on the second phase difference, the second distance, and the particular frequency; and comparing the first set of at least one origination direction to the second set of at least one origination direction to determine a common origination direction, wherein the common origination direction corresponds to the actual origination direction of the RF signal.

11. The method of claim 10, further comprising: generating, via the processor, a clock frequency by phase aligning the clock frequency with the RF signal; sampling, via the processor, the RF signal using the clock frequency to generate a data stream; and analyzing, via the processor, the data stream to determine that the RF signal is indicative of a UAV communication.

12. The method of claim 10, further comprising: generating, via a control loop, a clock frequency by estimating a sampling point for at least one symbols of the RF signal; sampling, via the processor, the RF signal using the clock frequency to generate a data stream; and analyzing, via the processor, the data stream to determine that the RF signal is indicative of a UAV communication.

13. The method of claim 10, further comprising removing at least one channel coding schemes from the RF signal, the at least one channel coding schemes comprising at least one of: a line coding, an error coding, or a data compression.

14. The method of claim 10, further comprising: identifying, via the processor, a header in the RF signal comprising a particular pattern of bits associated with a particular communication protocol; and analyzing, via the processor, the particular pattern of bits to identify at least one of a start bit, at least one data packets, a data transmission type, and a device identification number.

15. The method of claim 10, further comprising configuring, via the processor, a second antenna pair to receive the RF signal, wherein the second antenna pair comprises a second distance and positioned at a second orientation, and wherein the second distance is a physical distance between a third antenna and a fourth antenna of the second antenna pair.

16. The method of claim 15, further comprising selecting, via at least one multiplexer, between RF signals received via the first antenna pair and the second antenna pair.

* * * * *